(12) United States Patent
Hudecek et al.

(10) Patent No.: US 6,289,207 B1
(45) Date of Patent: Sep. 11, 2001

(54) COMPUTERIZED RADIO RECEIVER

(75) Inventors: Milan Hudecek, North Caulfield (AU); Bob Grove, Brasstown, NC (US)

(73) Assignee: Rosetta Laboratories Pty. Ltd. (AU)

( * ) Notice: Subject to any disclaimer, the term of this patent is extended or adjusted under 35 U.S.C. 154(b) by 0 days.

(21) Appl. No.: 09/217,712

(22) Filed: Dec. 21, 1998

Related U.S. Application Data

(63) Continuation-in-part of application No. PCT/AU96/00119, filed on Mar. 6, 1996.
(60) Provisional application No. 60/068,418, filed on Dec. 22, 1997.

(51) Int. Cl.[7] .................................................. H04B 1/18
(52) U.S. Cl. ........................... 455/150.1; 455/154.1; 455/154.2; 455/157.1; 455/158.4; 455/161.1; 455/161.3
(58) Field of Search ................. 455/150.1, 154.1, 455/154.2, 158.1, 158.2, 158.3, 158.4, 158.5, 161.1, 161.2, 161.3, 166.1, 166.2, 183.2, 157.1

(56) References Cited

U.S. PATENT DOCUMENTS

| | | | |
|---|---|---|---|
| 5,163,161 | * 11/1992 | Bowles et al. | 455/164.1 |
| 5,613,232 | * 3/1997 | Toshida et al. | 455/226.4 |
| 5,701,598 | * 12/1997 | Atkinson | 455/161.2 |
| 6,038,433 | * 3/2000 | Vegt | 455/164.2 |

* cited by examiner

Primary Examiner—Tracy Legree
Assistant Examiner—Temica M. Davis
(74) Attorney, Agent, or Firm—Stephen D. Carver

(57) ABSTRACT

A radio receiver comprises an RF tuner (10) on a computer card (11) having a frequency selector (19) for determining the current selected frequency. A programmed computer functions as a control system 100 controlling the tuner and a display screen 200 presents data and user selectable inputs to the user. An input peripheral device (101) enables the user to input data or information and commands to the control system. The control system causes a display (220) display on the display screen (200) in real time both digital and analogue indications of the current frequency being passed by the tuner (10); and provides a tuner frequency select control responsive to input of a frequency change command by the user to change the current selected frequency. Features include automatic changing of mode (AM, FM, etc) when stepping or scanning through frequencies; a simulated analogue tuning dial (225); multiple selectable modes of scanning; slow and fast rates of frequency changes; compensation for background RF from the computer and monitor via local antennas (38, 39); point-and-click on a displayed frequency spectrum to change frequencies; click-and-drag on a displayed frequency spectrum to scan along the spectrum; and Internet audio site selection.

25 Claims, 11 Drawing Sheets

COMPUTERIZED RADIO RECEIVER

CROSS-REFERENCE TO RELATED APPLICATIONS

This is a continuation-in-part of commonly-owned, copending International Patent Application No. PCT/AU96/00119, with an international filing date of Mar. 6, 1996.

This is also a continuation-in-part of commonly-owned, copending U.S. patent application Ser. No. 60/068,418 filed Dec. 22 1997.

TECHNICAL FIELD OF THE INVENTION

This invention relates to radio receivers and, more particularly, to the integration of radio receiver functions in a computer such as a personal computer.

BACKGROUND OF THE INVENTION

Currently available radio receivers include those which are dedicated and specially constructed for domestic, short-wave listening, scanning, amateur radio, and professional applications.

Domestic receivers usually have limited capabilities and performance. Shortwave receivers have better (but still limited) capabilities and performance, at a higher price. Many scanning receivers cover a wide range of frequencies, as much as 500 kHz to 512 MHz or more, and usually include a variety of scanning capabilities. However they are either limited to discrete frequency steps of approximately 5 kHz (which greatly reduces their ability to receive non-channelized signals), or else have mediocre RF performance, or both.

Amateur receivers have medium to high performance, but except for a few expensive units, have a limited frequency range. Professional receivers have high performance and capabilities, but are very expensive and outside the reach of all except professional and government users.

No receivers, which are generally available to the public, are capable of decoding received signals and making intelligent decisions based on the content of those signals.

SUMMARY OF THE INVENTION

It is an object of the present invention to provide a radio receiver having functions and capabilities which incorporate features from better quality radio receivers which are generally available to the public, including those intended for shortwave, scanning, and amateur applications and which can utilize a computer for user interface.

It is a further object to provide a radio receiver having a system for user control which can be readily understood and operated Furthermore, a preferred object is to provide a radio receiver capable of decoding received signals into a form recognizable by a computer, and of utilizing the computer to process and store such signals.

Further preferred objects include:

(a) the receiver is comparable to currently available high quality and high performance scanners;

(b) the receiver can operate in conjunction with a DOS PC or Apple Macintosh computer;

(c) the receiver can comprise a card installed in a PC expansion slot;

(d) the receiver can include means for decoding digitally encoded signals such as morse code and radio teletype;

(e) the receiver should be able to be priced less than conventional radio receivers having similar capabilities.

According to the present invention there is provided a radio receiver comprising:

an RF tuner which is operative to receive an input RF signal from an antenna, the tuner including a frequency selector for determining the current selected frequency so that the tuner produces an output signal derived from the selected RF frequency and which can be supplied to a peripheral output device;

a control system coupled to the tuner so as to control the operation thereof including operation of the frequency selector;

a display screen coupled to the control system, the control system being operative to control the presentation of data and the presentation of user selectable inputs by the display screen;

an input peripheral device coupled to the control system and by means of which the user can input data or information or commands to the control system;

the control system including:

a tuner frequency display control operative to cause display on the display screen in real time of the current frequency being passed by the tuner; and a tuner frequency select control responsive to input of a frequency change command by the user via the input peripheral device to cause the frequency selector of the tuner to change the current selected frequency of the tuner in accordance with the frequency change command.

Preferably the control system further includes:

a scan control selectively operable to cause the frequency selector of the tuner to change the current selected frequency of the tuner by a first desired incremental frequency step size; a receiver operating mode control operative to cause display on the display screen in real time of the current mode of operation of the tuner, the mode of operation including at least the current frequency band of the tuner operation;

a stepping size memory for storing a magnitude of the first frequency step size by which the tuner frequency is to be changed when the scan control is operating and for storing a second desired incremental frequency step size by which the tuner frequency is to be changed when the user inputs the frequency change command to step up or to step down from the instantaneous selected tuner frequency; and a mode and step size switch responsive to the tuner frequency select control and/or to the scan control and operative if the current selected frequency enters a different band when it is being changed to automatically change the tuner to the appropriate mode of operation for the different band and to automatically retrieve from the stepping size memory the appropriate first or second frequency step size for the different band for use in controlling incremental frequency changes of the current selected frequency. These features of the preferred embodiment help make the operation of the receiver simple for the user.

The tuner frequency select control is preferably operative to cause display on the display screen of an image of a user selectable tuner frequency modifier, the control system being operative, firstly, in response to user selection of the tuner frequency modifier image via the input peripheral device, to cause the frequency selector of the tuner to change the current selected frequency of the tuner in accordance with the user selection, the tuner frequency modifier image comprising an image of an analogue tuning dial having markings to indicate a simulated rotational position of the dial and, secondly, when the user selects the dial and inputs the frequency change command via the input peripheral device to cause the frequency selector of the tuner to change the current selected frequency, the tuner frequency select control causes display on the display screen in real time of an animation of rotation of the dial for as long as the frequency change command is being input. Also, the control system preferably further includes a stepping size memory for storing a desired incremental frequency step size by which the tuner frequency is to be changed when the user inputs the frequency change command to step up or to step down from the instantaneous tuner frequency. These features give the user interface by which the user operates the radio receiver a natural operating feel.

The control system may further include:

a scan control selectively operable to cause the frequency selector of the tuner to change the current selected frequency of the tuner by scanning through different frequencies; a scan mode control operative to cause display on the display screen of an image of a user selectable scan mode modifier, the control system being operative, in response to user selection of the image of the scan mode modifier via the input peripheral device to enable the frequency selector of the tuner to commence to automatically scan through frequencies different from the current selected frequency of the tuner when the scan control is operated, the scanning occurring according to a mode of scanning selected by the user from the modes:

(i) a first mode consisting of scanning of the frequency up or down from the current selected frequency in steps of a first desired incremental frequency step size, (ii) a second mode consisting of scanning of the frequency through a defined range of frequencies, and (iii) a third mode consisting of scanning of the frequency through a number of specific frequencies stored in a frequency memory; and a stepping size memory for storing a magnitude of the first desired incremental frequency step size by which the tuner frequency is to be changed when the scan control is operating in the first scanning mode. These features provide versatility for the user in scanning the RF spectrum for signals.

The tuner frequency select control is preferably responsive to input of the frequency change command by the user to change the frequency at one of two or more rates of change which is selectable by the user by a respective input via the input peripheral device, the control system further including a stepping size memory for storing a magnitude of a frequency step size by which the tuner frequency is to be changed when the frequency change command is input. This can enable the use of slower or faster movement through frequency ranges as the user decides.

Preferably the control system further includes: a receiver operating mode control operative to cause display on the display screen in real time of the current mode of operation of the tuner, the mode of operation including at least the current frequency band of the tuner operation; and a receiver power control operative to cause display on the display screen of an image of a power switch having an off condition and an on condition and between which the user can toggle by inputting a power command via the input peripheral device, the receiver power control being operative when the off condition of the power switch is selected firstly to cause display on the display screen of a quiescent image of a radio control panel with data presented on the display screen including the display of the current selected frequency being blanked and secondly to cause the tuner to be disabled, the receiver power control being operative when the on condition of the power switch is selected firstly to cause display on the display screen of an active image of the radio control panel with data being presented on the display screen including the current selected frequency and secondly to cause the tuner to be enabled.

To enable the user to directly change the tuner to a known frequency in one step, the input peripheral device preferably includes a set of numeric keys by means of which the user can input numeric data, the tuner frequency display on the display screen including a digital display of the numeric value of the current selected frequency, the tuner frequency display control being responsive to input of numeric data via the numeric keys to change the digital display of the frequency in real time as the numeric data is being input, and the tuner frequency select control being operative upon completion by the user of the inputting of the numeric data to cause the frequency selector to automatically change the current selected frequency of the tuner to the frequency represented by the input numeric data.

In one particular embodiment of the invention, the control system of the radio receiver includes a frequency range display control operative to cause display on the display screen of a frequency range display with associated presence indications at points along the frequency range display, the presence indications indicating the presence at particular frequencies of signals of significant strength indicative of detectable RF signals, and the control system further includes a frequency pointer control operative to cause display on the display screen of a frequency pointer which is movable on the display screen in response to movement input commands by the user via the input peripheral device, the tuner frequency select control of the control system being operative in response to input of the frequency change command by the user to cause the frequency selector to change the current selected frequency dependent upon the position of the frequency pointer in relation to the frequency range display.

The radio receiver preferably further includes a signal strength detector to provide an indication of the strength of the RF signal at frequencies within a band of frequencies around the current selected frequency, and the frequency range display comprises a display of a spectrum of received input signal strength throughout the band of frequencies, the presence indications comprising peaks in the displayed spectrum, the input peripheral device including a pointer moving means operable by the user to position the frequency pointer on the display screen on any selected peak in the displayed spectrum, the control system being operative in responsive to entry of the frequency change command by the user when the frequency pointer has been positioned on the selected peak to cause the frequency selector to change the current selected frequency to the particular frequency represented by the selected peak in the displayed spectrum. This is essentially a very simple and effective point-and-tune facility for the user.

In a further development, the input peripheral device has a continuous input switch which the user can operate to input a continuous frequency change command, the tuner frequency select control of the control system including a real time frequency changer operative in response to operation of the continuous input switch of the input peripheral device and while the frequency pointer is located on the display screen in a predetermined positional relationship to the frequency range display to cause the frequency selector to continuously scan the current selected frequency up or down from an initial selected frequency for as long as the continuous input switch is operated by the user. Preferably, the tuner frequency display control is operative to continuously show in real time the instantaneously selected frequency by means of a visible frequency marker superimposed on the frequency range display. These provide the user with a click-and-drag facility to scan the selected frequency up or down on the displayed spectrum.

The control system may be operative to update the frequency range display in real time as the current selected frequency is scanned up or down whereby the frequency range display provides to the user current information concerning the strength of signals at frequencies near to the current selected frequency. The background spectrum can be updated only at the instantaneously selected frequency as the frequency is scanned up or down on the displayed spectrum. Alternatively, a background RF tuner may be provided additional to the RF tuner may be provided having the frequency selector for determining the current selected frequency, the background tuner being operative to receive and detect RF signals in a band of frequencies around the current selected frequency, the background tuner having an associated signal strength detector to provide indications of the strength of the RF signals being received and detected at frequencies within the band, the background tuner being operative to scan through a range of frequencies on either side of the current selected frequency and the signal strength detector being operative to provide a simultaneous indication of the strength of the signals, the frequency range display control of the control system being responsive to the background tuner and to the signal strength detector to regularly update the frequency range display.

In a possible further embodiment of the invention the control system further includes an Internet mode control selectable by the user by selection of an Internet select switch image, and an Internet site memory containing data including Internet site addresses for a plurality of Internet sites which provide audio and/or audio-visual broadcasting via the Internet, access to the Internet site memory being provided by the Internet mode control to the user upon selection of the Internet select switch, whereby the user can select an Internet site to receive its audio and/or audio-visual broadcast through the peripheral output device of the radio receiver and on the display screen.

In addition to the invention comprising a radio receiver, the invention also provides a method of controlling the operation of a radio receiver, and a computer program for controlling the operation of a radio receiver, the method and program comprising operations to control the display of data and user selectable inputs to enable user monitoring and user control of the radio receiver's operation. The essential and optional features of the method and program will be understood from the preceding and following description of a radio receiver utilizing the method and program.

In an embodiment of the invention, a computerized radio receiver comprises:
an RF tuner which is operative to receive an input RF signal from an antenna, the tuner including a frequency selector for determining the current selected frequency so that the tuner produces an output signal derived from the selected RF frequency and which can be supplied to a peripheral output device;
a control system coupled to the tuner so as to control the operation thereof including operation of the frequency selector;
a display screen coupled to the control system, the control system being operative to control the presentation of data and the presentation of user selectable inputs by the display screen;
an input peripheral device coupled to the control system and by means of which the user can input data or information or commands to the control system;
the control system including:
a tuner frequency display control operative to cause display on the display screen in real time of the current frequency being passed by the tuner;
a tuner frequency select control responsive to input of a frequency change command by the user via the input peripheral device to cause the frequency selector of the tuner to change the current selected frequency of the tuner in accordance with the frequency change command,
a frequency range display control operative to cause display on the display screen of a frequency range display with associated presence indications at points along the frequency range display, the presence indications indicating the presence at particular frequencies of signals of significant strength indicative of detectable RF signals,
a frequency pointer control operative to cause display on the display screen of a frequency pointer which is movable on the display screen in response to movement input commands by the user via the input peripheral device, the tuner frequency select control of the control system being operative in response to input of the frequency change command by the user to cause the frequency selector to change the current selected frequency dependent upon the position of the frequency pointer in relation to the frequency range display.

The computerized radio receive may further comprise a signal search initiator which is selectable by the user, the frequency range display control being operative in response to selection by the user of the signal search initiator to cause display on the display screen of a real time plot of the strength of detected RF signals throughout a range of frequencies as the tuner scans through the range of frequencies in response to selection by the user of the signal search initiator.

The control system may be operative to initiate a predetermined action upon the signal strength exceeding a predetermined threshold, the predetermined action being selected from the group of actions comprising stopping the scanning of the tuner through different frequencies, pausing the scanning of the tuner through different frequencies, recording of the frequency at which the signal strength has exceeded the predetermined threshold, and initiating recording of the received signal at the predetermined frequency.

The frequency range display control may be operative to cause display on the display screen of presence indications of different color depending on the detected characteristics of the signals at particular frequencies, the characteristics including the nature of the radio signal and whether it is an RF signal containing voice (including music) signals, data signals, and carrier-only signals.

The computerized radio receive may further comprise a sensitivity threshold control operative to provide a threshold for the signal strength enabling identification and response only to signals having a strength exceeding the threshold, the frequency display control being operative to cause display on the display screen of a sensitivity threshold level associated with the frequency range display whereby signals having a strength exceeding threshold can be seen on the frequency range display.

The threshold level display may comprise a squelch line superimposed on the frequency range display, the separation of the squelch line from the frequency axis of the frequency range display being indicative of the threshold level, the radio receiver further including a squelch line segmenting control operable in response to user commands to break the squelch line into multiple segments, the distance of each individual segment from the frequency axis being selectively variable under the control of the user whereby the signal threshold level can be selectively varied for different parts of the received frequency spectrum.

The computerized ratio receiver may further comprise a frequency scan range control operative in response to user commands input by the user through the input peripheral device to select and initiate scanning by the tuner through a frequency range within a wider spectrum of frequencies displayed on the display screen as the frequency range display, the input peripheral device including a computer mouse and the frequency scan range control being responsive to operation by the user of the mouse to click on a start point on the frequency range display and then drag the mouse to an end frequency when, upon release of the mouse button, the range of frequencies covered by the dragging of the mouse becomes delimited as the selected frequency band through which scanning is to occur.

The computerized ratio receiver may further comprise a historical scan memory operative to store scanned frequency spectra including frequencies and signal strength data, the frequency range display control being operative to display past scans through frequency bands in the form of a three-dimensional graph with a horizontal X-axis representing frequency, a vertical Y-axis representing detected RF channels or signal strength, and a receding Z-axis representing time with preceding scans being displaced on the receding Z-axis, the frequency pointer being operable by pointing at different scan spectra to enable selection by the user of an earlier scan to be brought forward as the current real time frequency band.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

The structure, operation, and advantages of the present preferred embodiment of the invention will become further apparent upon consideration of the following description taken in conjunction with the accompanying drawings, wherein.

DETAILED DESCRIPTION OF THE EXEMPLARY EMBODIMENTS

Figure 1:
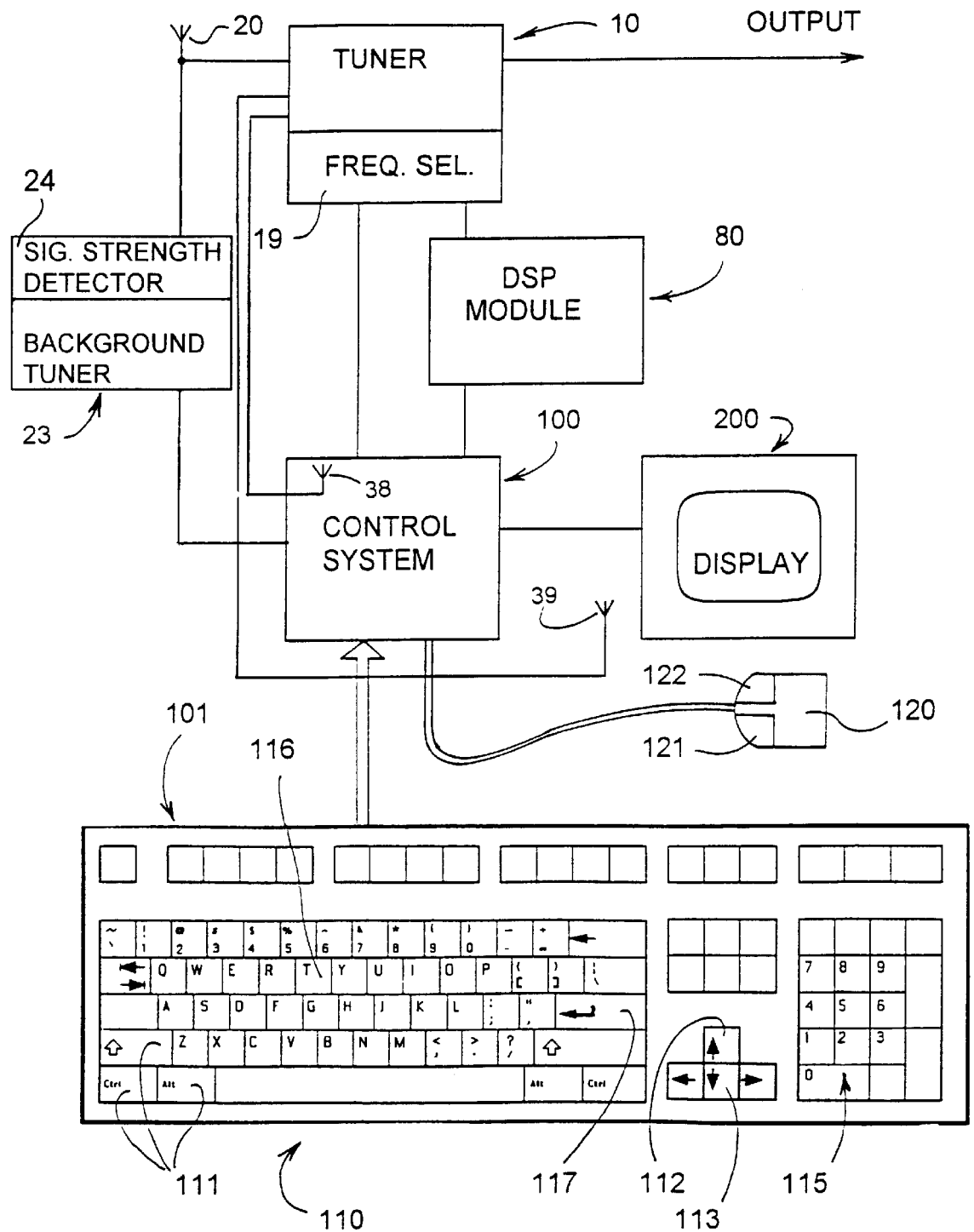
FIG. 1 is a schematic diagram of a radio receiver according to the present invention.

The receiver includes a tuner 10 which can be provided on a card for fitting to an expansion slot of a conventional PC. The tuner 10 may be, for example, a superheterodyne receiver. The card assembly 11 comprises a backplane 12 and shielded module 13, and is designed to be plugged into a standard PC bus. All user I/O connections can be at the rear of the card, to be accessible from the outside of the PC.

The hardware connections can comprise:
a. jacks 15, 16 for the connection of antenna 20;
b. a jack 25 for the connection of a speaker or headphones;
c. a multi-pin connector 30 containing for example the following signal lines:
  (1) a audio output for driving a tape recorder or other audio device;
  (2) an open collector DC line, for activating an external audio device such as a tape recorder;
  (3) data I/O line, to enable the PC to exchange data with an external device;
  (4) a audio input, capable of accepting audio from an external audio source;
  (5) DC power output.

Figure 2:
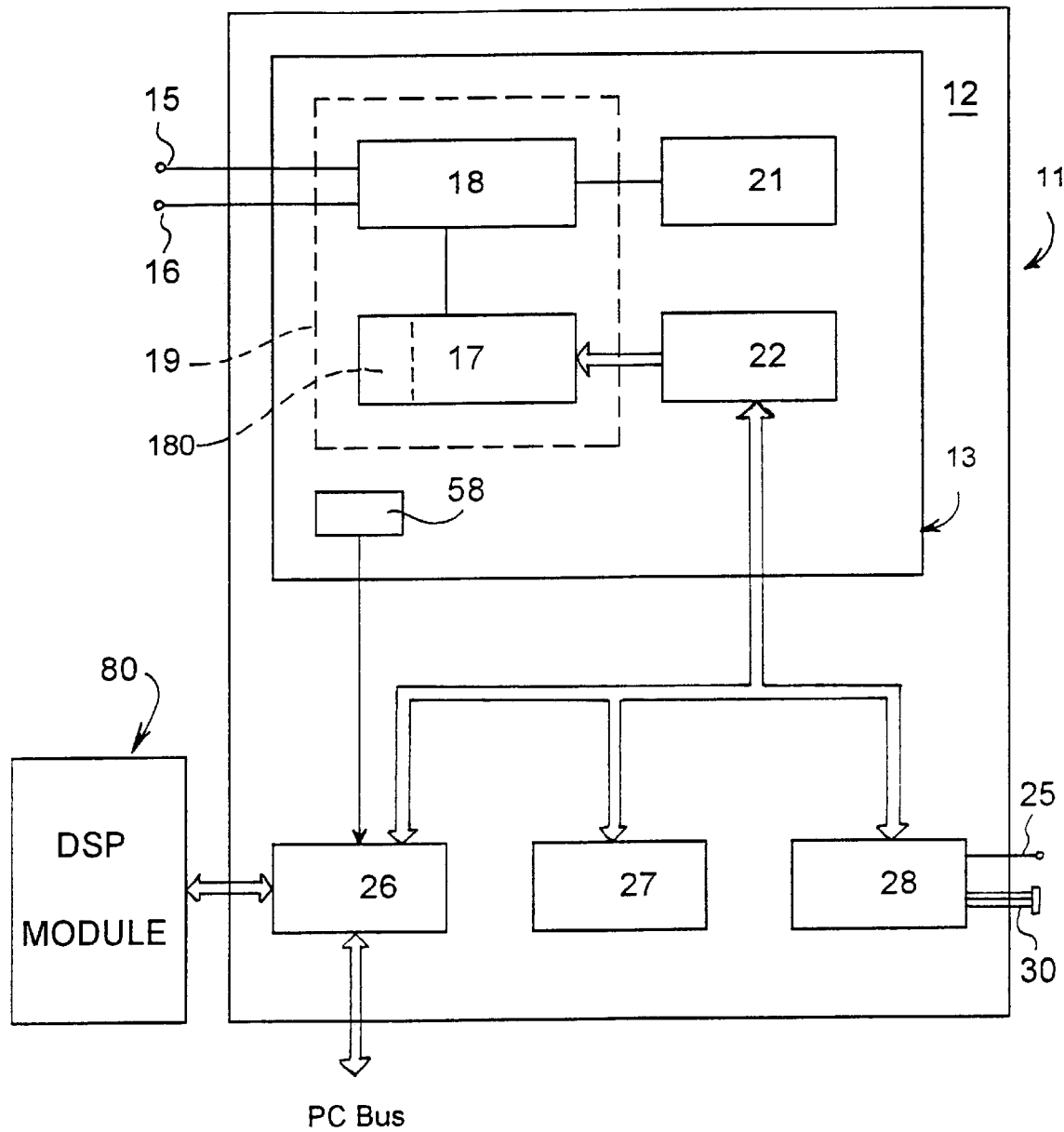
FIG. 2 is a functional block diagram of a card which is useable in a PC to provide the tuner and other operations.

The tuner 10 in FIG. 2 includes in the shielded module 13 a frequency synthesizer 17 and an RF front end circuit 18 (which respectively operate as the tunable local oscillator and mixer of the superheterodyne receiver) and which together function as a frequency selector 19 of the tuner for determining the current selected frequency. Processing circuit 21 receives the intermediate frequency signal and in conventional manner processes it, e.g. by filtering, amplification, demodulation and audio processing. Suitable power and interface circuits 22 are also provided for conventional purposes. Outside the shielded module 13, but on the card 11, are a microcontroller 26, A/D and D/A converters 27, and external interface circuits 28 all for conventional purposes or for functioning as will be readily understood to the person skilled in the art.

The backplane 12 will accept an optional DSP module 80 to provide additional signal processing capabilities, such as audio filtering, demodulation, and signal recognition described later.

The control system 100, which is preferably a programmed PC computer in which the tuner 10 is connected, controls the operation of the tuner including operation of the frequency selector 19. A display screen 200 such as the VDU of the PC is also coupled to the control system 100 and the control system controls the presentation of data and the presentation of user selectable inputs by the display screen. An input peripheral device 101, shown as a computer keyboard 110 and mouse 120, is coupled to the control system 100 to enable the user to input data, information, and commands to the control system.

Because the radio receiver operates through a wide frequency range, e.g. 500 kHz to 1.2 GHz, RF noise generated by operation of electronic equipment forming part of the radio receiver (or being used in the proximity) can interfere with discrimination of wanted RF signals at many frequencies, or can cause spurious identification of signals e.g. when scanning, there is provided a background antenna. This comprise two individual antennas, a CPU antenna 38 located inside the metal casing of the computer constituting the control system 100 to receive RF signals generated by the computer's CPU, and a peripheral antenna 39 located adjacent the computer monitor constituting the display 200 to receive RF signals generated by the monitor (and other local equipment such as printers, etc.). The RF signals are input from CPU antenna 38 and peripheral antenna 39 to the tuner 10 which subtracts this background RF from the signals received from the main antenna 20, e.g. by reversing the phase, suitable scaling, and addition to the input from antenna 20.

Figure 3:
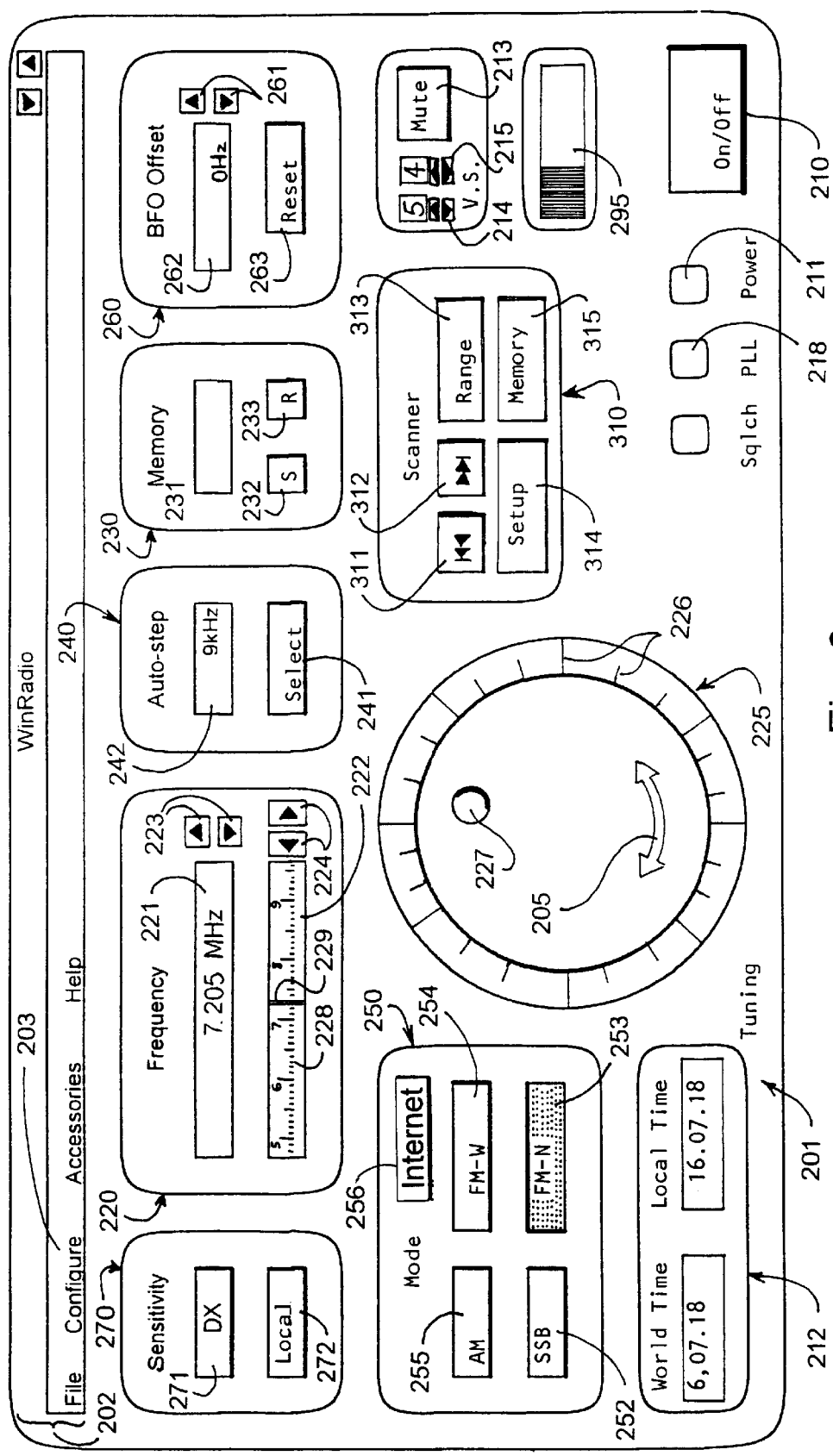
FIG. 3 is a possible screen display for presenting data and enabling user selection of receiver functions.

FIG. 3 shows a possible presentation of data and user selectable inputs to be presented on the display screen 200 by operation of the control system 100. The displayed image 201 is shown being displayed as a Windows TM application with information, icons and function bar 202 being provided at the top of screen. The image 201 is a simulation of the display of a sophisticated radio receiver so that the presentation of data to the user is readily identifiable and understandable. The image 201 also includes images of objects, particularly switches and knobs, which a user can identify and select for the purpose of inputting data or commands to the control system and hence to the tuner 10. The invention can be most readily understood by describing the operation of the control system in conjunction with the presentation and operation of the user interface constituted by the display image 201.

Figure 4A:
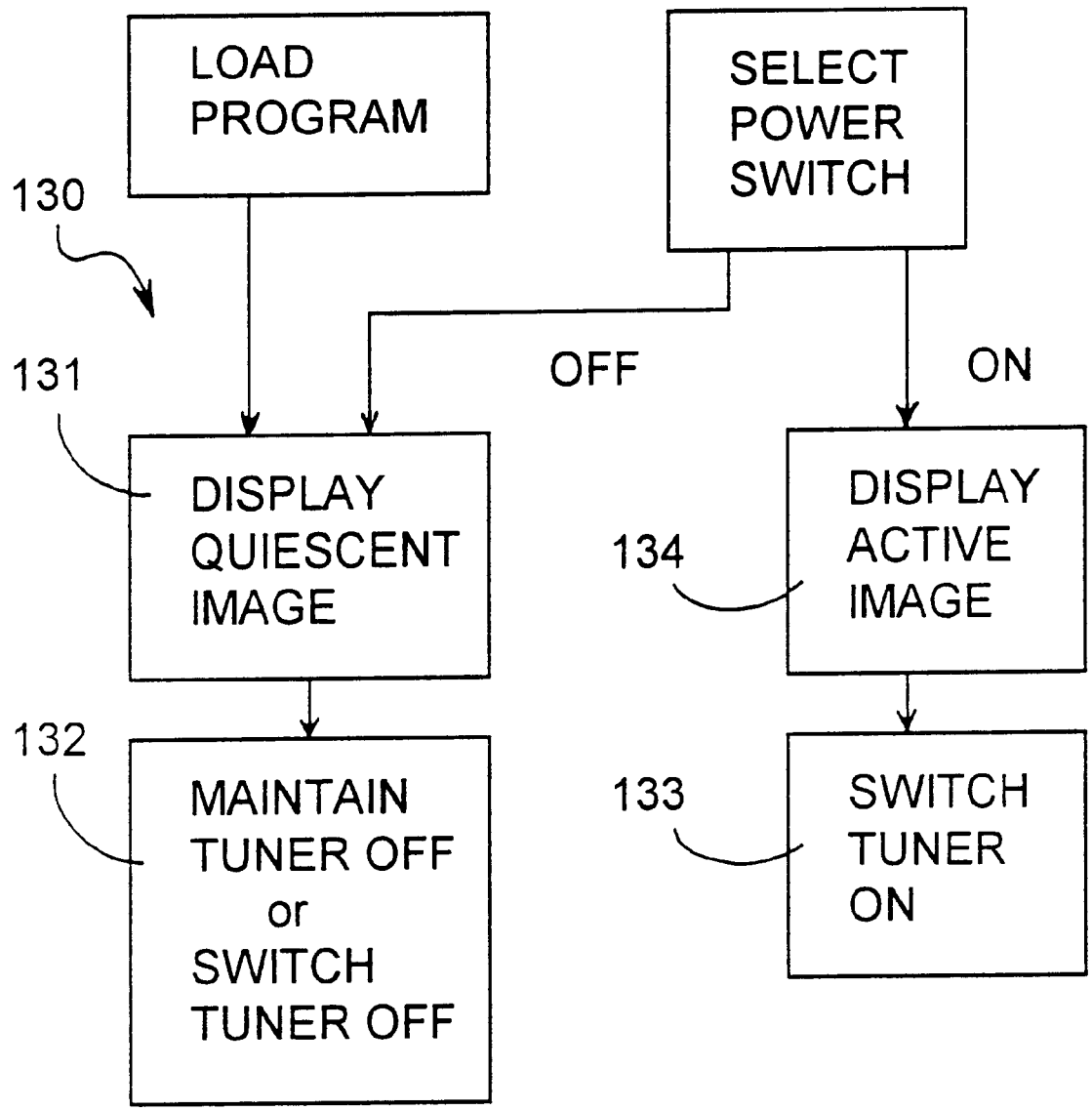
FIG. 4 comprises schematic flow charts for some main functional operations of the control system implemented by computer program.

The control system includes a receiver power control 130 (FIG. 4A) operative to cause display on the display screen 200 of an image of a power switch 210 having an off condition and an on condition and between which the user can toggle by inputting a power command via the input peripheral device 101.

The image 210 of the power switch is an image of a push button switch, the display screen 200 showing an image of the push button switch in a depressed position when in its on condition and in a projecting position when in its off condition.

The receiver power control 130 is part of a computer software which implements most of the functional operations of the control system 100. When the software is first loaded or when the off condition of the power switch 210 is selected, the program means 131 cause the display of a quiescent image in which all of the simulated hardware features of the image 201 are displayed, but data displays (e.g. display of the frequency to which the tuner is set) and status of the radio receiver (such as the particular mode currently selected) are not displayed i.e. are blanked. However, if desired, a user can configure the system via the menu item 203 so that there are some or all data displays active upon initial loading. This quiescent image therefore simulates the user being presented with a radio receiver which is not yet switched on. The tuner 10 is also maintained off or is disabled by program means 132.

By user selection of the switch image 210, e.g. by pressing a hot key combination and/or by moving a cursor on-screen via the mouse 120 onto the on/off switch image 210 and clicking the mouse button 121, the control system is commanded by program means 133 to turn on the tuner 10. Also the program means 134 changes the image 201 to display an active image as shown in FIG. 3 in which data displays and status displays are illuminated, so as to display the current frequency, the current selected mode of operation, etc. The display therefore simulates a radio receiver which is turned on, displaying data and current receiver status.

Data displays as shown in FIG. 3 include:
a power on lamp 211 which is extinguished in the quiescent image but illuminated in the active image,
a time and date display 212 (derived from the computer's internal date and time clock),
output volume and squelch level displays 213,
a memory display 230 having a currently selected channel indicator 231 indicating a channel identifier from memory (if a memorized channel is selected) and images 232 or 233 of "Store" and "Retrieve" switches which are user selectable to respectively pop up a menu for storing the currently selected frequency for future retrieval and to pop up a schedule of pre-programmed and/or user programmable frequencies, e.g. for radio stations, enabling user selection of a frequency or channel to which the receiver is instantly switched,
a step display 240 including a step size display 242 for frequency stepping,
a frequency display 220 to show the frequency to which the receiver is currently tuned.

Figure 4B:
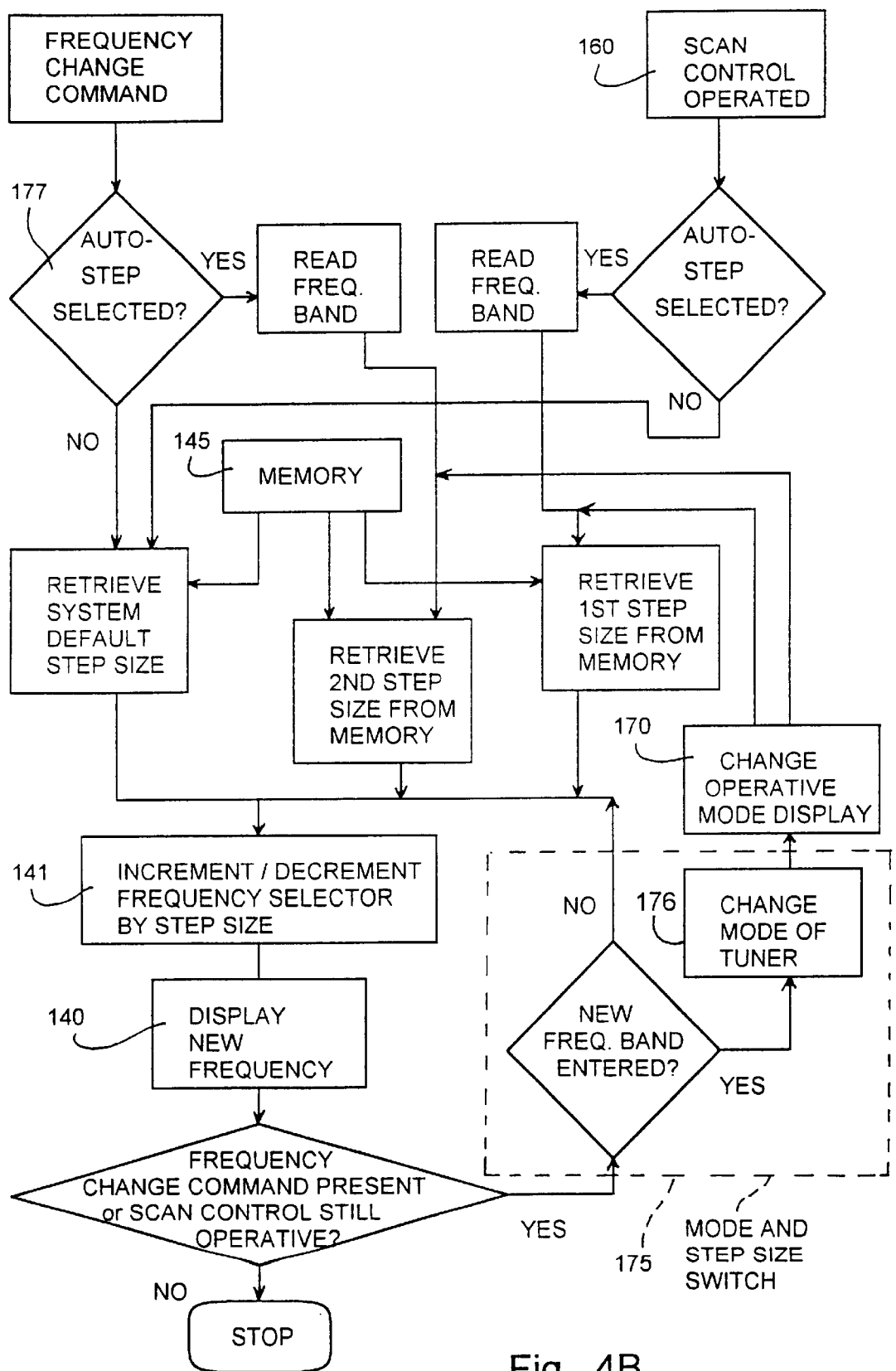

The control system 100 includes program means functioning as a tuner frequency display control 140 (FIGS. 4B to 4D) operative to cause the display 220 on the display screen 200 in real time of the current frequency being passed by the tuner 10; and a tuner frequency select control 141 responsive to input of a frequency change command by the user via the input peripheral device 101 to cause the frequency selector 19 of the tuner 10 to change the current selected frequency of the tuner in accordance with the frequency change command.

The frequency display 220 comprises a digital frequency display 221 and an analogue dial display 222 although only one may be provided if desired. Below 1 MHz, the frequency may be displayed in kHz. At 1 MHz and above, it may be displayed in Mhz.

The analogue frequency display 222 is in the form of an image of a graduated scale 228 and which is caused to move in real time past a fixed current frequency marker line 229 in response to input of the frequency change command to thereby indicate the current selected frequency by the relative location of the marker 229 along the graduated scale 228. The tuner frequency display control 140 is also operative to cause display on the display screen 200 of a scale zoom control 224 which is user selectable via the input peripheral device 101 and which when selected initiates either magnification or reduction of the scale depicted by the image of the graduated scale 228. The illustrated zoom control 224 comprises magnify and reduce scale buttons selected by cursor positioning and clicking the mouse 120.

The image 201 includes user selectable tuner frequency modifiers 223 and 225. The modifiers 223 are arrow buttons selectable by positioning of the screen cursor on the button and clicking the mouse key (and/or pressing a hot key combination) to increment or decrement the frequency in certain step sizes.

Figure 4C:
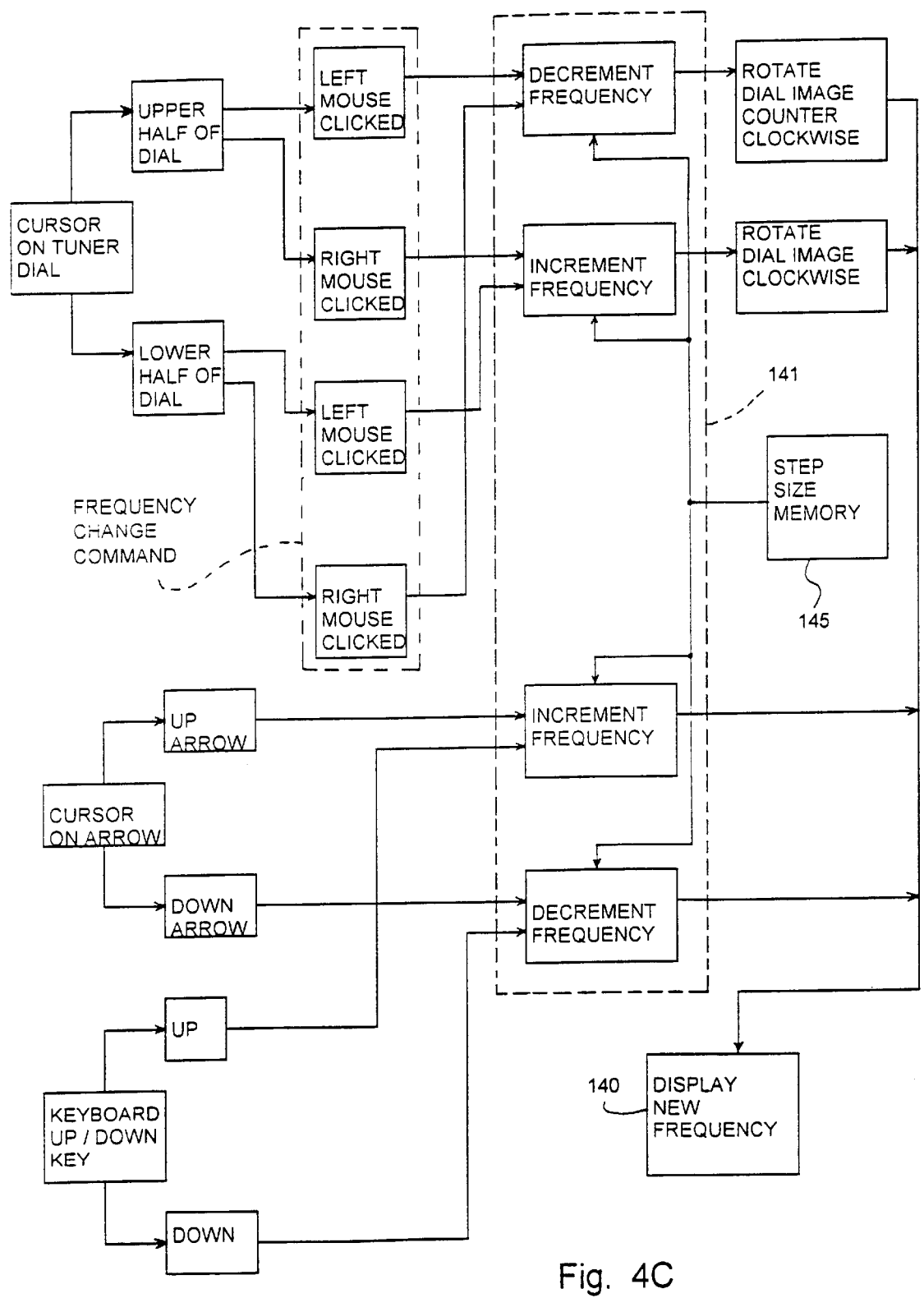

The tuner frequency modifier image 225 comprises an image of an analogue tuning dial having markings 226, 227 to indicate a simulated rotational position of the dial. When the user selects the dial 225 and inputs the frequency change command via the input peripheral device 101 to cause the frequency selector 19 of the tuner 10 to change the current selected frequency, the tuner frequency select control 141 causes display on the display screen 200 in real time of an animation of rotation of the dial 225 for as long as the frequency change command is being input (see upper part of FIG. 4C). The image of the tuning dial is an image of a circular dial 225 having a marking 227 which occupies different angular positions relative to the centre of the circular dial in response to user selection of the dial and input of the frequency change command so as to thereby simulate rotation of the dial. The image of the dial 225 simulates rotation in a clockwise direction for a frequency change command to increase the current selected frequency and vice versa. The user selects the dial 225 by entering commands on the input peripheral device 101 so as to move a cursor 205 on the display screen 200 to position the cursor on the image of the dial and the user then inputs the frequency change command while the cursor is positioned on the image of the dial. The computer mouse 120 has a left mouse button 121 and a right mouse button 122, and as shown in FIG. 4C, user depression of the left mouse button 121 while the cursor 205 is located in the upper half of the image of the dial 225 initiates a decrement of the frequency and simulated rotation of the dial in a counter clockwise direction, depression of the right mouse button 122 while the cursor is in the upper half of the image of the dial initiates an increment of the frequency and simulated rotation of the dial in a clockwise direction, depression of the left mouse button 121 while the cursor is located in the bottom half of the image of the dial initiates an increment of the frequency and simulated rotation of the dial in a clockwise direction, and depression of the right mouse button while the cursor is located in the bottom half of the image of the dial initiates a decrement of the frequency and simulated rotation of the dial in a counter clockwise direction. As shown in FIG. 3, the control system 100 is operative to generate a cursor 205 on the display screen 200 having the shape of an arcuate double headed arrow when the cursor is positioned in the image 225 of the dial, the arcuate double headed arrow being concave downwardly when the cursor is positioned in the upper half of the image of the dial and being concave upwardly (as shown) when the cursor is positioned in the lower half of the image of the dial.

The step size memory 145 stores desired incremental frequency step sizes by which the tuner frequency is changed when the user inputs the frequency change command. The stepping size memory 145 stores at least two incremental frequency step sizes, the smaller of which (e.g. a value of 1 kHz, or 10 kHz if in FM-W mode) is used by the control system 100 to determine the step size by which the tuner 10 changes the current selected frequency when the user selects the analogue tuning dial 225 and inputs the frequency change command whereby the tuning dial is selectable for enabling a fine tuning of the selected frequency.

Faster stepping may be selected by the user. The tuner frequency select control 141 is responsive to input of the frequency change command by the user to change the frequency at one of two or more rates of change which is selectable by the user by a respective input via the input peripheral device 101. The keyboard 110 has auxiliary keys 111, such as the "Ctrl", "Shift", and "Alt" keys on a computer keyboard, the user selection of the different rates of change of the frequency being effected by depressing one of the auxiliary keys 111 of the keyboard 110 simultaneously with inputting the frequency change command. The inputting of the frequency change command without depression of one of the auxiliary keys 111 causes the frequency selected to change at a base rate of change, inputting of the frequency change command simultaneously with depression of a first one of the auxiliary keys 111 such as the "Shift" key causes the frequency selected to change at ten times the base rate, and inputting of the frequency change command simultaneously with depression of a second one of the auxiliary keys 111 such as the "Alt" key causes the frequency selected to change at one hundred times the base rate. The selection of different rates of frequency change is available with both systems for issuing the frequency change command, i.e. (1) manipulating the mouse 120 to position a cursor 205 on a screen image of a frequency modifier 223, 225 and then depressing the mouse button 121, and (2) depressing either the "up" or "down" arrow key 112, 113 on the computer keyboard 110.

Figure 4D:
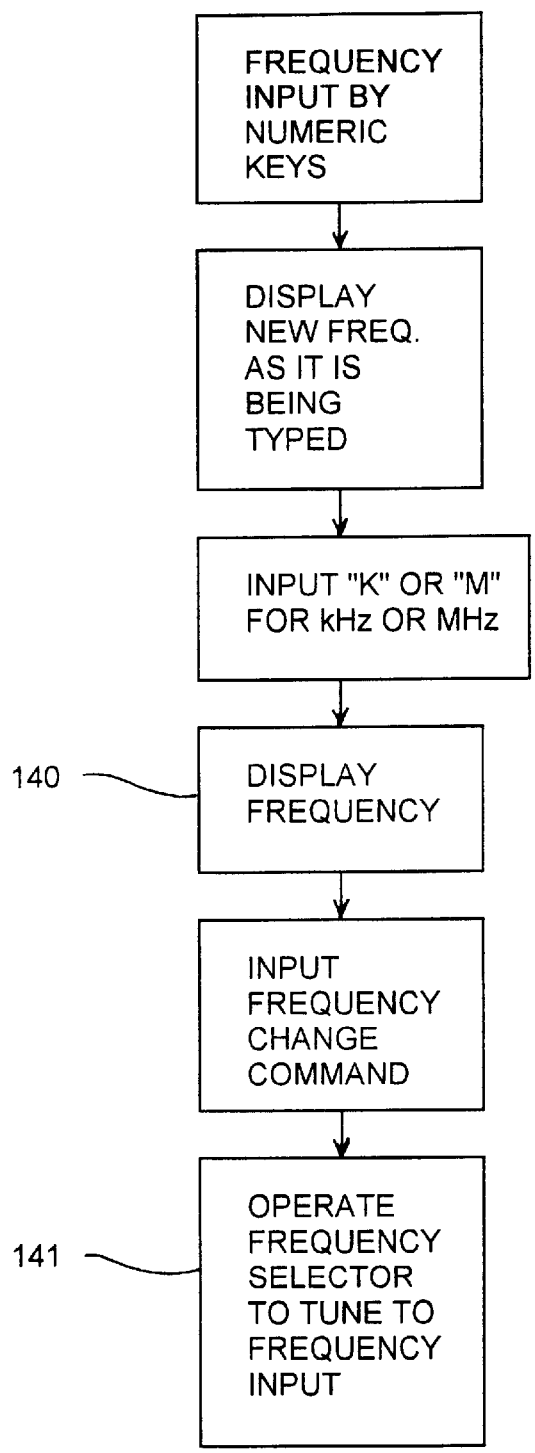

In addition to selecting and activating frequency modifiers 223, 225 in the image 201 and using the "up" and "down" arrow keys 112, 113, the frequency may also be changeable by typing in a new frequency on the keyboard 110. The keyboard 110 includes a set of numeric keys 115 by means of which the user can input numeric data. As shown in FIG. 4D the tuner frequency display control 140 is responsive to input of numeric data via the numeric keys 115 to change the digital display 221 of the frequency in real time as the numeric data is being input, and the tuner frequency select control 141 is operative upon completion by the user of the inputting of the numeric data to cause the frequency selector 19 to automatically change the current selected frequency of the tuner 10 to the frequency represented by the input numeric data. The keyboard 110 includes alphabetic keys 116 including at least K and M keys which, when selected after at least one numeric key 115 has been used to input numeric data, indicate that the numeric data represents frequency measured in kHz and MHz respectively. The keyboard 110 has an Enter key 117 which, when selected after entry of numeric data by means of the numeric keys 115, constitutes the frequency change command.

If the user attempts to enter a frequency outside the allowable limits (as determined by the currently selected mode to be described later) the control system 10 can be operative to an error signal such as a beep, briefly display "Invalid frequency" or the like on the screen and either abort the process or make an assumption of the desired frequency value, e.g. assuming MHz if a frequency less than the capability of the tuner is entered.

To permit quick setting of the receiver to channelized frequencies, it is possible to select a step size, which is any number resulting in permissible frequencies. If the arrow keys 112, 113 or frequency modifier images 223 are selected, the radio should step by the selected increment. If the radio is tuned to such a frequency that the next step would be to a frequency which is outside the available range, stepping should cease and the PC should issue an appropriate alert to the user.

The user is able to select an option whereby the step size is automatically adjusted according to frequency band, unless another step size has been selected. For example, the initial defaults may include:

a. 531–1620 kHz (AM band): step=9 kHz (or 10 kHz in North America)
 b. 87.5–108 MHz (FM-N band): step=50 kHz The user is able to add new ranges, and edit or delete existing ones.

The control system 10 includes a scan control 160 (FIG. 4B) selectively operable to cause the frequency selector 17 of the tuner 10 to change the current selected frequency of the tuner by a first desired incremental frequency step size, and a receiver operating mode control 170 operative to cause a display 250 on the display screen 200 in real time of the current mode of operation of the tuner, the mode of operation including at least the current frequency band of the tuner operation. The step size memory 145 stores a magnitude of the first frequency step size by which the tuner frequency is to be changed when the scan control is operating and for storing a second desired incremental frequency step size by which the tuner frequency is to be changed when the user inputs the frequency change command to step up or to step down from the instantaneous selected tuner frequency. Program means 175 functions as a mode and step size switch responsive to the tuner frequency select control 141 and to the scan control 160 and operative if the current selected frequency enters a different band when it is being changed to automatically change the tuner 10 to the appropriate mode of operation for the different band by operation of the band change program means 176 and to automatically retrieve from the stepping size memory 145 the appropriate first or second frequency step size for the different band for use in controlling incremental frequency changes of the current selected frequency. The control system 100 further includes program means 177 operating as an auto stepping switch which, upon user selection of an auto stepping switch image 241 displayed on the display screen 200, is operative in determination of incremental changes in the current selected frequency. When the user inputs the frequency change command, the frequency selector 19 operating in response to the frequency select control 141 changes the current selected frequency by the second incremental frequency step size and when the scan control 160 is operated the frequency selector 19 changes the current selected frequency by the first incremental frequency step size. The frequency step size when the frequency change command is input or when the scan control 160 is operated and when the auto stepping switch 241 is not selected is a system default step size able to have a different value to the first and second frequency step sizes.

The first and second incremental frequency step sizes and the system default step size are each independently user programmable. The first frequency step size can be equal to the second frequency step size, so that user initiated frequency stepping or automatic frequency scanning both use the same frequency increments.

The mode and step size switch 175 is responsive to both the tuner frequency select control 141 when user initiated and the scan control 160 so that, if the current selected frequency enters a different band, the appropriate mode of operation of the tuner 10 is automatically commenced and also the relevant first or second incremental frequency step size is automatically retrieved from the stepping size memory 145 for controlling the frequency increments.

The possible frequency bands of the tuner operation include the SSB band (including LSB and USB), AM band, wide-band FM band, and narrow-band FM band. The receiver further includes a beat frequency oscillator (BFO) 180 operative to re-establish at the receiver the suppressed carrier frequency of an SSB signal received, the receiver further including a BFO offset control which is user operable by selection of a BFO offset image 262, 263 generated on the display screen 200 by the control system to adjust in small frequency increments the frequency of the BFO above or below the current selected frequency of the tuner 10 so as to thereby fine tune the reception of the SSB signal received.

The control system 100 further includes a receiver operating mode select control 182 (FIG. 4E) operative in response to input of a mode change command by the user via the input peripheral device 101 to switch the current operating mode from the mode determined by the mode and step size switch 175 for the band in which the current selected frequency falls to the mode selected by the user.

In operation, to change step sizes, the user can position the cursor on the select switch 241 in the step display 240 and by clicking on the select switch 241 can toggle between an "Auto-step" mode of stepping and scanning as described above, and a "Fixed step" mode of stepping and scanning using default step sizes. The step sizes, whether preprogrammed or user input, may be the same or different for different frequency bands. For example in AM broadcast bands, the frequency allocations to broadcasters are separated by internationally or nationally standardized intervals. These intervals can be different for different countries so that user alternatives to the default stepping intervals is provided for more efficient scanning.

A "fixed step" mode can provide for steps of 1 kHz. Conventional receivers often use 5 or 12.5 kHz steps. However, the present invention can provide high accuracy and simulated analogue (continuous) tuning by tuning in 1 kHz steps by way of a programmable phase locked loop which has separate numerator and denominator inputs and using the computer to determine which numerator and which denominator will allow closest tuning at the selected frequency. Therefore upon each increment of frequency, many divisions, comparisons and other calculations may be undertaken by the computer in iterative steps to calculate the closest quotient to the selected frequency whilst still having real time display and operation.

The control system causes a display 250 by the display screen 200 in real time of the current mode of operation of the tuner which includes the mutually exclusive operating modes of the receiver. The user can select any of the modes, either by clicking on the appropriate button 252–256, or hotkey combination (e.g. alphabetic key B, N, W, A or I respectively). The current mode is displayed, e.g. by highlighting or illuminating, or showing the selected button as an image of a depressed push button switch—see FM-N switch 253 in FIG. 3.

Figure 4E:
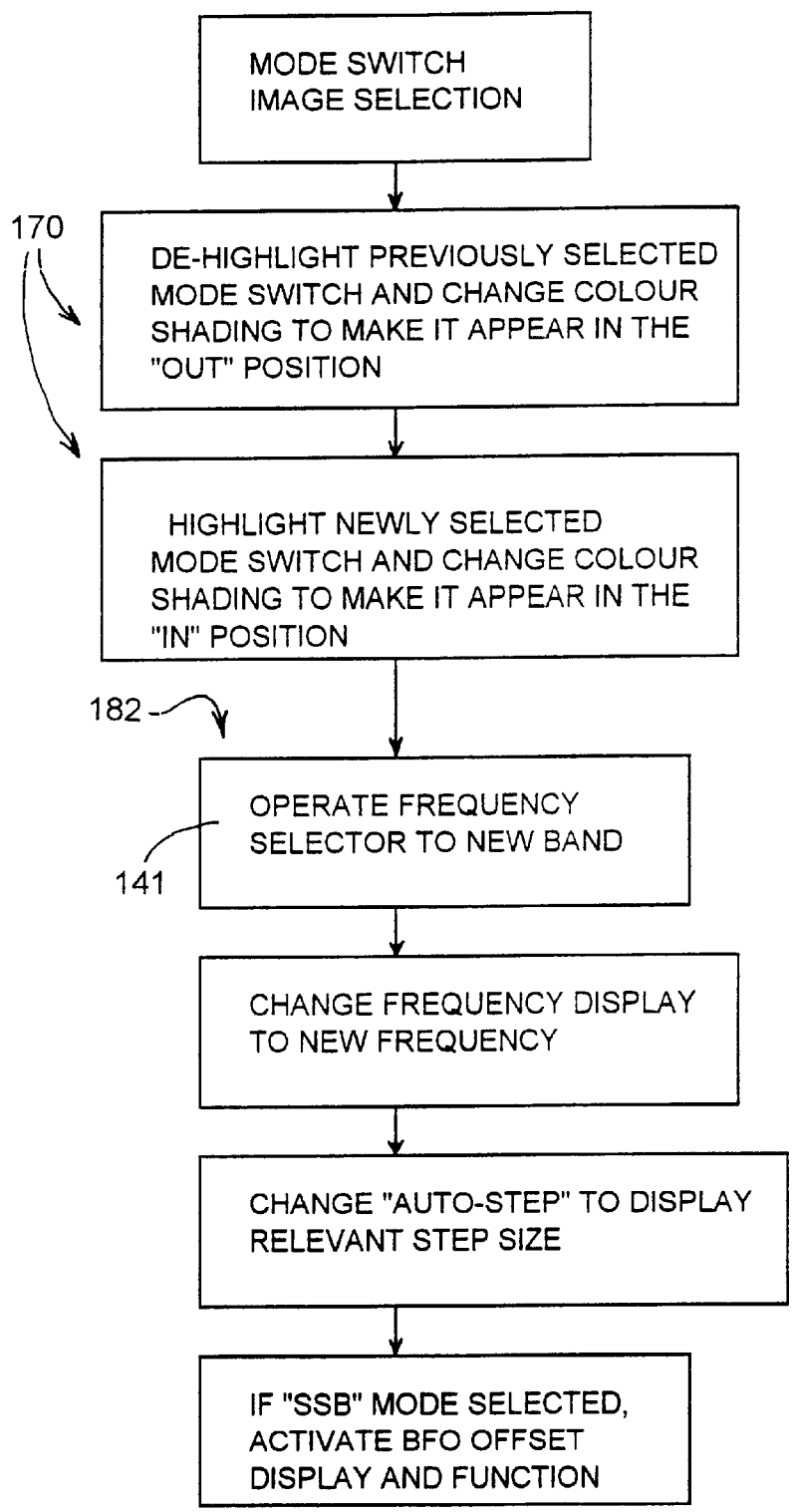
Figure 4F:
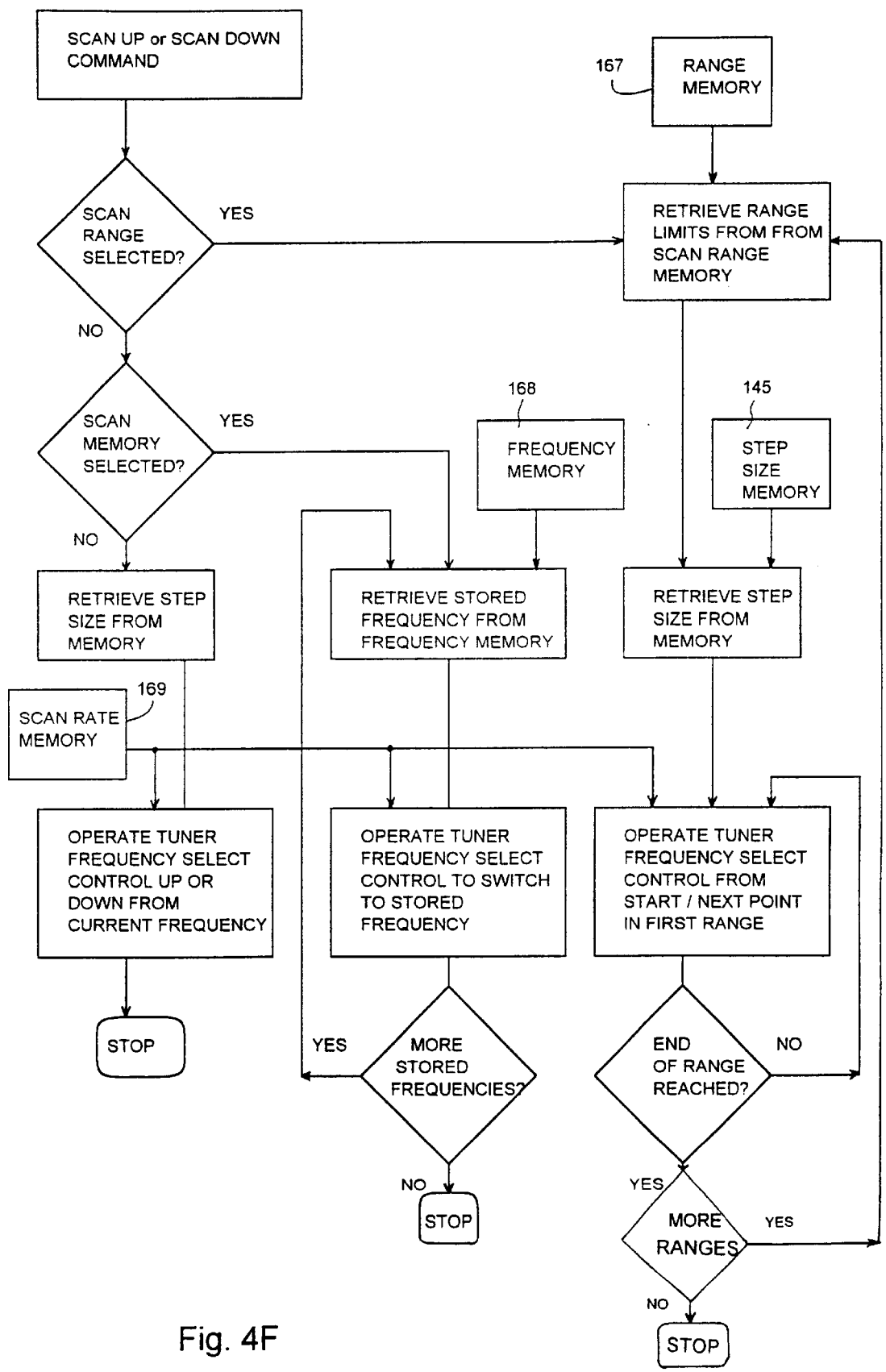

As shown in FIG. 4E, the control system is operative when a new mode switch is selected by the user to de-highlight the previously selected mode switch and to highlight the newly selected mode switch. If SSB mode switch 252 is selected, the BFO offset display 260 can be illuminated, this image section 260 being quiescent if AM or FM mode is selected. The BFO offset can be user adjusted e.g. in 5 Hz steps by selection and operation of the arrow icons 261 while the BFO offset value is displayed in the display window 262. Selectable Reset switch image 263 is also provided for resetting a default BFO offset e.g. zero Hz. The offset may be an integer between predefined upper and lower frequency limits. When the user is changing the offset, the frequency offset displayed by the window 262 is continuously updated in real time. Direct numeric keyboard entry of the offset value is also possible by locating the cursor on window 262 and inputting the desired value.

A feature that invokes audio and/or audio-visual broadcasts on the Internet is provided by selecting the Internet mode switch 256. New services on the Internet now include broadcasting of audio information, similar in contents to classic wireless broadcast stations. Until now, such "Internet radio" has been accessible via the usual tools for browsing the World Wide Web: browsers such as Netscape Navigator or Microsoft Explorer. The actual reception is done using various audio data compression and streaming technology, such as RealAudio (tm) which are available as "plug-ins" for most browsers. Classic wireless stations of course continue broadcasting, and remain accessible by ordinary wireless radio receivers.

These two methods of radio broadcasting reception may be combined into an integrated hardware/software package which allows reception of the transmission in both domains.

A preferred embodiment would consist of a PC card containing the radio circuitry (or an external radio receiver connected to the personal computer via a suitable interface for example RS-232, PCMCIA or USB) for classical radio, and a front-panel software which allows the control of reception of both classical radio as well as Internet stations (provided of course the user was logged on the Internet when using this feature or would be logged onto the Internet upon selection of this feature).

In one possible implementation of this invention, the front panel display would have front panel buttons for AM (255), FM (253, 254) and Internet 256, thus adding "Internet" to the classic modulation modes. When switched to AM or FM, the ordinary (wireless) radio receiver would be engaged. When switched to Internet, the software would allow the user to browse through a list of stations stored in memory that can be found on the Internet, and receive the stations using any of available technologies for Internet audio broadcasting.

The list of such stations could be updated. For example, the user could download such a list from the manufacturer of the above-described radio device, from a particular Web page dedicated to such purpose. Such "station refresh" function would be a function accessible from the software front panel, e.g. by an option presented to the user upon selection of the Internet select switch image 256.

The Internet stations could be arranged in a number of ways, for example as a mere list of stations. These stations can be also sorted by content, country, language or other relevant sorting method preferable to the user.

Another possible arrangement is to use a classic tuning knob 225 to move from one station to another, with the name of the station displayed in what normally would be the frequency display 221

A possible further embodiment of this invention would have an added capability of displaying visual broadcasts on the Internet. For example, an embodiment having this feature would be also capable of receiving movie broadcasts on the Internet by the user selection of a displayed mode switch similar to the Internet audio broadcast reception described above.

As previously described the control system includes a scan control 160 to cause the frequency selector 19 of the tuner 10 to change the current selected frequency of the tuner by scanning through different frequencies. The scan mode control is operative to cause display on the display screen 200 of an image of a user selectable scan mode modifier 310, the control system 100 being operative, in response to user selection of the image of the scan mode modifier via the input peripheral device 101 to enable the frequency selector 19 of the tuner 10 to commence to automatically scan through frequencies different from the current selected frequency of the tuner when the scan control is operated. The scanning mode can be selected by the user from the modes:

(i) a first mode consisting of scanning of the frequency up or down from the current selected frequency in steps of the first desired incremental frequency step size, stored in memory 145 as described previously;

(ii) a second mode consisting of scanning of the frequency through a defined range of frequencies, and (iii) a third mode consisting of scanning of the frequency through a number of specific frequencies stored in a frequency memory.

The scan control 160 is operated in the first scanning mode by selecting either the scan down button 311 or the scan up button 312.

For scanning in the second mode, the user selects the Range scan button 313. The user is presented with a menu which enables access to a scan range memory 167 which can store at least two user definable ranges of frequencies through one or more of which the scan control 160 can scan the current selected frequency of the tuner 10.

For scanning in the third mode, the user selects the Memory scan button 315 and the system presents a menu to enable selection of options, such as defining a group or groups of memorized frequencies through which to scan. The frequencies are stored in a frequency memory 168 which may comprise a data base of both known listed allocated transmitting frequencies and user stored frequencies (stored previously e.g. via memory store button 232). During scanning in the third mode, the respective channel identifier stored in memory is displayed by indicator 231 as such frequency is selected.

The control system 100 is operative to generate for the user upon selection of the Setup button 314 a scanner configuration menu which presents scanning options selectable by the user, the scanning options including at least two and preferably all of the following options:

(a) stop scanning when an input signal is detected, (b) pause upon detection of an input signal and remain indefinitely at that frequency unless that input signal disappears, whereupon resume scanning, (c) pause upon detection of an input signal for a predetermined (user programmable) pause time and remain at that frequency even if the input signal disappears in the pause time, and (d) pause upon detection of an input signal for the predetermined pause time, but resume scanning if the input signal disappears in the pause time. The selected scanning option is consulted and followed whichever mode of scanning is active.

When the scanning stops or pauses upon detection of an input signal, the control systems may have program means operative to generate on screen a menu of user selectable options, including an option to write the current selected frequency to memory for later retrieval and tuning to the same frequency. Other options can include "stop scanning" (if pause only is otherwise operative) and "resume scanning" (for immediate resumption of scanning).

The control system also includes a scan rate memory 169 in which a scan rate value is stored determining the number of frequency changes per second effected by the frequency selector when the scan control is operated, the value in the scan rate memory 169 being programmable by the user through the menu presented on selection of the Setup button 314.

The user can select two levels of sensitivity to reduce overloading or distortion when strong signals are present or to improve reception of weak signals by selecting maximum sensitivity switch 271 or local switch 272 of Sensitivity display 270.

The user can change the volume by clicking on up/down buttons 214, or by pressing the left and right arrow keys on the keyboard, or if desired by hotkeying and entering a number. The volume should change simultaneously with the button 214 or arrow key being pressed.

When an FM mode is selected, the user may change the squelch level by clicking on up/down buttons 215 or, if desired, by hotkeying and entering a number. The squelch level should change simultaneously with the buttons 215 being pressed. An additional Mute button 213 is provided to instantly suppress the audio output.

Figure 4G:
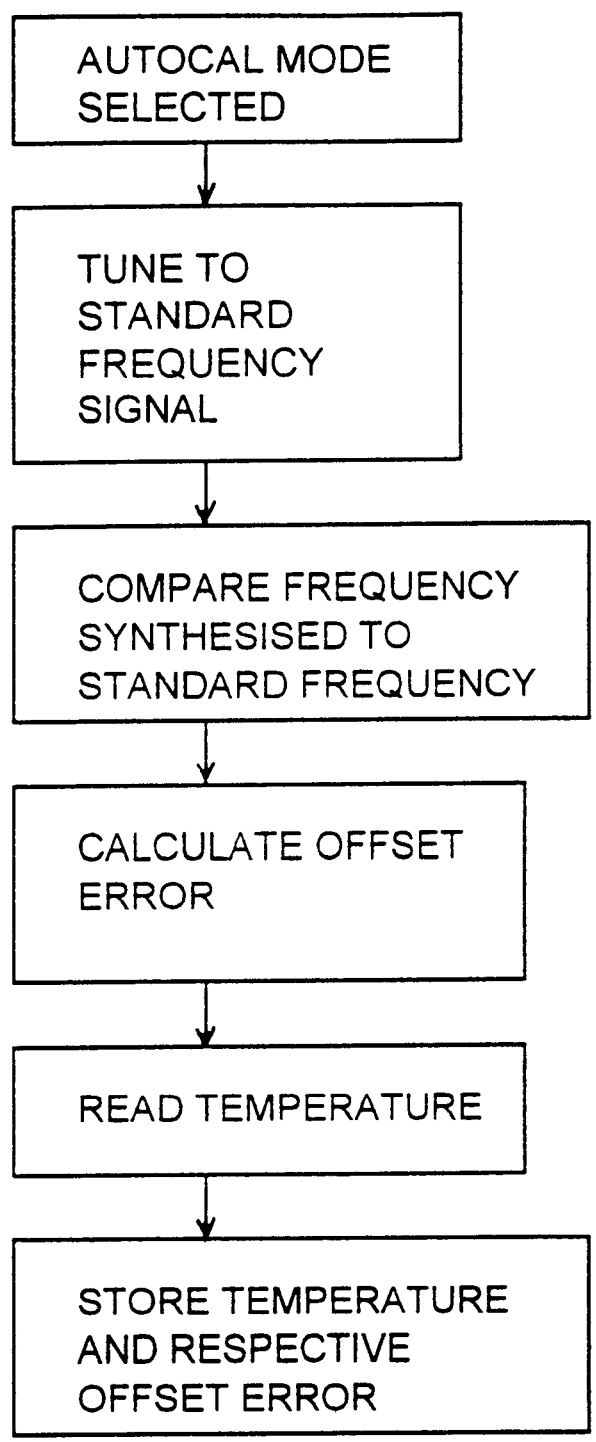
Figure 5:
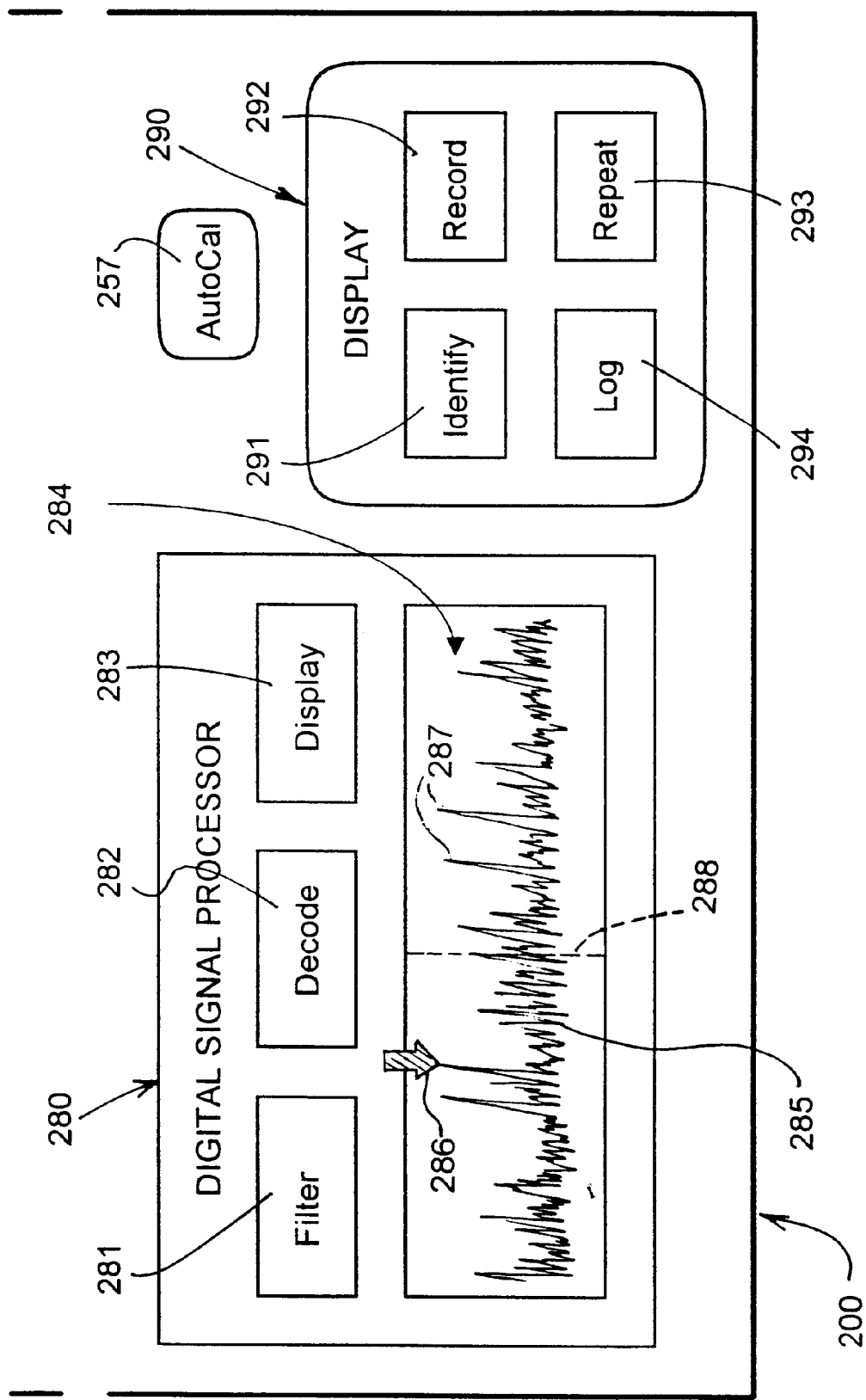
FIG. 5 shows additional screen display panels for a radio receiver providing additional functional capabilities.

The radio receiver embodying the present invention may provide additional functions in a more sophisticated embodiment, the screen isplays of data and user selectable inputs being illustrated in FIG. 5. An auto calibrate mode can be provided to enable the radio receiver to be calibrated to compensate for frequency drift particularly due to temperature variations of components. When the AutoCal mode switch 257 is selected and activated, as shown in FIG. 4G the control system 100 causes the tuner to tune to a standard frequency transmission such as an accurately known radio station, measure the frequency error between the received standard frequency and the synthesized frequency of the tuner (using the digital signal processor described later), record the temperature measured by the temperature sensor 58 provided inside the module 13, and store in memory the data relating to frequency corrections subsequently to be used during RF signal reception at various different temperatures.

The display section 290 includes selectable "Identify" switch 291 which the user can select to cause a screen to pop up providing, for example, further identification information concerning the selected frequency band, e.g. "FM broadcasting band" or other stored descriptions of bands. The screen may also provide for example a list of transmitting stations within a particular range, e.g. + or −5 kHz of the instantaneous frequency. The user can delete or edit identified stations. If desired, once selected, a map can be displayed showing transmitting stations located on the map. Stored longitude and latitude for each station can enable such display. During set up of the system, the user can input the site of use, e.g. "Melbourne", and the program can automatically highlight stations within a certain radius of the site when the identify screen is popped up.

The "Record" switch 292 upon user selection starts an external tape recorder or can, with signal compression, create a computer file where the received signal (demodulated or not) is stored.

User selection of the "Repeat" switch 293 enables replay of the signal received for example within a preceding time interval. For example incoming signals can be automatically stored in a buffer where the received signal from a programmable time interval, e.g. 20 seconds, is continuously stored. The "Repeat" switch 293 replays this 20 seconds of signal e.g. to enable the user to attempt again to discriminate faint or noisy signals.

The control system provides a user selectable log facility which when selected by the user operation of log button 294 automatically stores in a memory log the current selected frequency and the current date and time, and provides the user with a prompt for optional user entry of user comments concerning the radio signal received. The memory log is retrievable by the user at a later time.

The scale display 295 indicates in real time a measure of the accuracy of tuning or the strength of the signal, e.g. by a luminous bar, the length of which is proportional to the signal strength.

The PLL display 218 comprises an illuminated display active when the phase locked loop is operating.

It is possible for the control system to control the radio reception and receive and process the signal that is received by the radio. For example, the output of tuner 10 becomes the input of control system 100 and the output can be displayed on display 200 or processed for other uses.

The receiver preferably further includes a digital signal processor (DSP) module 80 which may be an additional card connected to the card assembly 11. The DSP module is operative under the control of the control system to digitally process the audio output from the module 13. The displayed image 201 includes a DSP data display and selectable input display 280. By selecting the filter switch 281, the receiver can process the received signals in the DSP module 80 by digital filtering enhancement procedures so as to reduce noise and interference for improved signal clarity.

By selecting the decode switch 282, the receiver can monitor a signal being received and can recognize and decode certain signals such as morse code, radio teletype, and other digitally encoded signals automatically in real time. The decoded text can be displayed on screen as it is being received and decoded and/or can be stored to a file on the computer or can be output for other storage or processing. For example the receiver can be programmed to monitor particular frequency bands continuously search for key words specified by the user (for example "SOS" in morse code), and in response initiate such further action as has been specified by the user, for example raising an alarm and/or storing the signal on the PC's hard disk or a tape recorder. The DSP can also be operated to compress and store analogue signals for later decompression for listening or processing.

Operation of the display switch 283 causes the control system to instruct the DSP to analyze signals, e.g. for real time signal spectrum display by the display. When the DSP functions as a spectrum analyzer it is operative when selected by the user to initiate a scan through a range of frequencies and to generate a display 284 on the display screen 300 of a spectrum comprising a plot 285 of received input signal strength through the range of frequencies. The input peripheral device 10 including a cursor moving means constituted by mouse 120 operable by the user to position a cursor functioning as a frequency pointer 286 on the display screen 200 on any peak in the displayed spectrum 285, the control system being operative in response to entry of a tune command by the user when the cursor has been positioned on the selected peak (e.g. a click of the mouse button 121) to cause the frequency selector 19 to shift the current selected frequency to the particular frequency represented by selected peak in the displayed spectrum 285.

At a more general level, whether the DSP module 80 is provided or not, the control system includes a frequency range display control, implemented by software, operative to cause display on the display screen 200 of a frequency range display 284 with associated presence indications 287 at points along the frequency range display, the presence indications 287 indicating the presence at particular frequencies of signals of significant strength indicative of detectable RF signals. The control system 100 also includes a frequency pointer control, software implemented, operative to cause display on the display screen 200 of the frequency pointer 286 which is movable on the display screen in response to movement input commands by the user via the input peripheral device constituted by the mouse 120. The tuner frequency select control 141 of the control system 100 is operative in response to input of the frequency change command by the user to cause the frequency selector 19 to change the current selected frequency dependant on the position of the frequency pointer 286 in relation to the frequency range display 284. In the particular illustrated embodiment, the radio receiver includes a signal strength detector 24 (illustrated in FIG. 1 as part of the background tuner 23, but it could be part of the tuner 10 or a separate circuit) to provide an indication of the strength of the RF signal at frequencies within a band of frequency around the current selected frequency. In this embodiment, the frequency range display 284 is a display of a spectrum of received input signal strength throughout the band of frequencies and the presence indications 287 comprise peaks in the displayed spectrum. The input peripheral device comprised by mouse 120 is operable by the user to position the frequency pointer 286 on the display screen 200 on any selected peak in the displayed spectrum 285. The control system 100 is operative in response to entry of the frequency change command by the user when the frequency pointer 286 is positioned on the selected peak, e.g. depression of the mouse button 121, to cause the frequency selector 19 to change the current selected frequency to the particular frequency represented by the selected peak in the displayed spectrum 285. Essentially the system provides a particularly simple tuning function for the user by enabling the user to point to a peak in the spectrum and click the mouse button 121 to automatically tune to that frequency.

A further advantageous feature of the preferred embodiment is to provide the input peripheral device (mouse 120) with a continuous input switch (left mouse button 121 for example) which the user can operate to input a continuous frequency change command. The tuner frequency select control 141 includes a real time frequency changer operative in response to operation of the continuous input switch 121 and while the frequency pointer 286 is located on the display screen 200 in a predetermined positional relationship to the frequency range display 284 to cause the frequency selector 19 to continuously scan the current selected frequency up or down from an initial selected frequency for as long as the continuous input switch 121 is operated by the user. As illustrated in FIG. 5, the tuner frequency display control 140 is operative to continuously show in real time the instantaneously selected frequency by means of a visible frequency marker 288 superimposed on the frequency range display 284. In this particular arrangement, to scan the frequency up or down from the currently selected frequency indicated by the marker 288, the user can use the mouse 120 to position the frequency pointer 286 on the marker 288, and then by clicking and holding depressed the left mouse button 121 followed by moving the cursor functioning as the frequency pointer 286 to the right or left, the selected frequency can be scanned up or down from the initial selected frequency. Thus the user is provided with a click-and-drag facility for scanning the frequency up or down on the displayed spectrum 285.

Preferably the control system 100 is operative to update the frequency range display 284 in real time as the current selected frequency is scanned up or down, whereby the frequency range display 284 provides to the user current information concerning the strength of signals at frequencies near to the current selected frequency indicated by the marker 288. The updating of the spectrum in real time can occur by measuring the instantaneous signal strength as the frequency is scanned up or down the spectrum 285. That is, the displayed spectrum of signal strength verses frequency is updated beneath the cursor as the scanning occurs so that the spectrum is updated only as the frequency is scanned along the spectrum.

As an alternative, however, the radio receiver illustrated in FIG. 1 includes a background tuner 23 in addition to the RF tuner 10 having the frequency selector 19 for determining the current selected frequency. The background tuner 23 receives and detects RF signals in the band of frequencies around the current selected frequency and has an associated signal strength detector 24 to provide indications of the strength of the RF signals being received and detected at frequencies within the band. The background tuner 23 is operative under the control of the control system 100 to scan through a range of frequencies at either side of the current selected frequency and the signal strength detector 24 provides simultaneous indications of the strength of the signals. The frequency range display control of the control system 100 is responsive to the background tuner 23 and to the signal strength detector 24 to regularly update the frequency range display 284 so that the spectrum 285 displayed is substantially a real time spectrum display. Although the background tuner 23 and associated signal strength detector 24 are illustrated as separate to the tuner 10, they could be provided by a special portion of the same receiver circuit.

In summary, the preferred embodiment can provide:

(a) a click-and-tune facility to enable efficient investigation of interesting peaks on the displayed spectrum, (b) a click-and-drag facility allowing the user to move the frequency pointer along the displayed frequency spectrum with the receiver responding in real time to the movements of the pointer, (c) refreshing of the displayed frequency spectrum under the moving pointer by measuring the signal level at each frequency indicated by the pointer and updating the displayed signal strength spectrum at each point, and (d) by use of two receivers, one can be used to scan the spectrum to continuously update the spectrum, thereby reflecting real time or near real time information in the frequency band while the other receiver is associated with the frequency marker on the displayed spectrum for instant response to movements of the frequency pointer.

The control system 100 can be operative to display the present squelch level, e.g. as a proportion of the signal strength, as a bar graph similar to signal strength display 295. Because of absolute value changes in signal strength, as well as changes in signal strength relative to the background level, the control system can be programmed to automatically vary the squelch level e.g. as a function of both background level and instantaneous signal level. Thus, if a strong signal is being received much stronger than background noise around that frequency, the squelch level may shift to a relatively high level. One possibility is to automatically adjust the squelch level to a level higher than the average noise level by a (user programmable) percentage of the signal strength above the average noise level. The automatic squelch level variation may be operative while tuned to a particular frequency and/or while changing frequencies (e.g. when scanning).

The status of the receiver can be saved in a configuration file when exiting to be recalled when the next sessions commences.

GRAPHIC SCANNING FACILITY

In the past, a typical implementation of signal search ("scanning") function in a communications radio receiver involved at least the means of setting the starting frequency, the step size and the signal threshold (squelch) value. When scanning, the receiver would tune to the starting frequency first, then increment the frequency by the specified step size until a signal (stronger than a certain threshold) was found, or until a final frequency value was reached. The scanning activity would typically be indicated by the frequency display showing frequency values gradually incrementing as the scanning progresses.

The integration of radio receivers with personal computers, for example as described by our earlier patent application PCT/AU96/00119, makes it possible to introduce an innovative scanning arrangement, where the scanning progress is indicated by a much more informative display.

In a computer controlled receiver, the computer can be used to provide a spectrum analyzer facility for the receiver, displaying the spectrum graph of the received signal within a certain range (i.e. a graphic plot of the received signal strength versus frequency).

The spectrum graph does not need to be merely a passive display as it is common with most spectrum analyzers: it can be made part of an interactive front-panel arrangement, where clicking the mouse on a particular point on the displayed frequency spectrum tunes the receiver to the corresponding frequency. Furthermore, dragging the mouse continuously could cause the receiver to be tuned in accordance with the user's hand movements (as described in a Continuation-In-Part of our earlier patent application PCT/AU96/00119).

The functions of a spectrum analyzer are combined with that of a scanning receiver, whereby the signal search activity will be accompanied by a simultaneous real-time display of frequency spectrum (signal strength versus frequency), resulting in a new type of scanning radio receiver interface.

In a typical arrangement, a signal strength graph will start emerging from the left-hand edge of the screen upon activation of the signal search function. The graph will then gradually extend to the right proportionally to the frequency range already scanned. If the signal level is higher than a user-preset sensitivity threshold, this is considered a "hit" and will typically trigger a special action by the receiver.

The scanning sensitivity threshold (squelch) value can be represented graphically by a line displayed over the spectrum graph. In a preferred embodiment the vertical distance of the squelch line from the X-axis of the graph (the frequency axis) should be adjustable by the user to represent the signal level at which the scanner should "hit" an active frequency channel. Preferably, the squelch line could be broken into segments (by clicking a mouse), and the distance of these individual segments from the X-axis could be adjusted by dragging them up or down with a mouse, so that the squelch sensitivity could be adjusted individually for different parts of the received frequency spectra.

At the point when the receiver hits an active frequency channel, the receiver can either stop, pause, record the frequency or perform some other user-selectable activity, such as start recording the signal. Typically, the portion of the signal strength graph which represents an active channel will be displayed in a different color. It is preferable that different colors of active channels are used for different types of transmission (for example, red for voice transmissions, yellow for data, white for carrier-only signals, etc.).

The claims of this invention are:

(1) The frequency scanning facility of a radio receiver which is combined with that of a spectrum analyzer, so that the signal search function will invoke a simultaneous spectrum display function.

(2) The scanner sensitivity control (squelch) of a radio receiver that is represented graphically by a horizontal line within a frequency spectrum display. This line can be broken into segments (corresponding to frequency ranges) and the vertical distance of these segments from the lower horizontal edge of the spectrum graph represents the scanner sensitivity value within the respective frequency ranges, adjustable by the user.

(3) The scanning facility of a radio receiver where various types of intercepted signals (voice, data, carrier-only, etc.) are distinguished by graphic means within the spectrum graph, for example by different color segments of the signal strength graph or by different color segments of the X-axis (the frequency axis)

(4) The scanning facility of a radio receiver where the starting and the ending frequencies of the spectrum display adjust automatically from an initial wide band to a narrower band where activity was detected.

(5) The scanning facility of a radio receiver where the user can select a preferred frequency band from a wider spectrum display by clicking the mouse on the spectrum display. For example, the user could click on the appropriate point of the X-axis to select the starting frequency, then drag the mouse to the end frequency in a similar way as "marking a block" in a typical word processor. In a preferred embodiment, the marked frequency block would be indicated by a different color of a corresponding segment of the X-axis. Upon selecting this band, the signal search within this selected band could then start automatically, or be invoked by the user.

(6) The scanning facility of a radio receiver where the user could revert from a selected narrow band of a scanned spectrum display to a wider band, preferably by clicking on a button, or by selecting the stored scanned spectrum from a list of past scans.

(7) The scanning facility of a radio receiver, where past frequency scans would be stored as graphic spectra, immediately selectable for review by clicking on an item in a list. Preferably, the stored spectra would also include the hit frequencies.

(8) The scanning facility of a radio receiver, where past frequency scans would be stored as graphic spectra and where hit frequencies (preferably graphically represented as spikes or other icons) may be individually, or quantitatively, deleted from the displayed spectra or retrieved with their details displayed or used to tune the receiver.

(9) The scanning facility of a radio receiver, where undesirable signals (such as local oscillator "birdies" generated inside the receiver or other interference signals) can be excluded from the future scans by selecting the unwanted signal peaks graphically on the scanned spectrum, using the mouse or keyboard.

(10) The scanning facility of a radio receiver, where past scans are displayed in a form of a 3-dimensional graph with X-axis representing frequency, Y-axis representing active channels (the types of channels, such as voice, data, unmodulated carrier, etc., distinguished by graphic means such as colors) and Z-axis representing time.

What is claimed is:

1. A radio receiver comprising:

an RF tuner which is operative to receive an input RF signal from an antenna, the tuner comprising a frequency selector for determining a current selected frequency so that the tuner produces an output signal derived from the selected RF frequency which can be supplied to a peripheral output device;

a control system coupled to the tuner to control an operation thereof including operation of the frequency selector;

a display screen coupled to the control system, the control system being operative to control the presentation of data and the presentation of user selectable inputs by the display screen;

an input peripheral device coupled to the control system by means of which a user can input data or information or commands to the control system;

the control system comprising:

a tuner frequency display control operative to cause display on the display screen in real time of the current frequency being passed by the tuner;

a tuner frequency select control responsive to input of a frequency change command by the user via the input peripheral device to cause the frequency selector of the tuner to change the current selected frequency of the tuner in accordance with the frequency change command;

a scan control selectively operable to cause the frequency selector of the tuner to change the current selected frequency of the tuner by a first desired incremental frequency step size;

a receiver operating mode control operative to cause display on the display screen in real time of a current mode of operation of the tuner, the mode of operation including at least a current frequency band of the tuner operation;

a stepping size memory for storing a magnitude of the first frequency step size by which the tuner frequency is to be changed when the scan control is operating and for storing a second desired incremental frequency step size by which the tuner frequency is to be changed when the user inputs the frequency change command to step up or to step down from an instantaneous tuner frequency;

a mode and step size switch responsive to the tuner frequency select control and/or to the scan control and operative if the current selected frequency enters a different band when it is being changed to automatically change the tuner to the appropriate mode of operation for the different band and to automatically retrieve from the stepping size memory an appropriate first or second frequency step size for the different band for use in controlling incremental frequency changes of the current selected frequency; and, an auto stepping switch which, upon user selection of an auto stepping switch image displayed on the display screen, determines incremental changes in the current selected frequency, whereby when the user inputs the frequency change command the frequency selector changes the current selected frequency by the second incremental frequency step size and when the scan control is operated the frequency selector changes the current selected frequency by the first incremental frequency step size, the frequency step size when the frequency change command is inputted or when the scan control is operated and when the auto stepping switch is not selected being able to have a value different from the first or second frequency step size.

2. A radio receiver as claimed in claim 1, wherein the scan control is selectively operable to cause the frequency selector of the tuner to change the current selected frequency of the tuner by scanning through different frequencies according to a mode of scanning selected by the user from the following modes:

(i) a first mode consisting of scanning of the frequency up or down from the current selected frequency in steps of a first desired incremental frequency step size, (ii) a second mode consisting of scanning of the frequency through a defined range of frequencies, and (iii) a third mode consisting of scanning of the frequency through a number of specific frequencies stored in a frequency memory.

3. A radio receiver as claimed in claim 2, wherein:

the first frequency step size is stored in the stepping size memory for a particular frequency band, a different first frequency step size being stored in the stepping size memory for a different frequency band whereby when the scan control is operating and the current selected frequency of the tuner shifts to a different frequency band, the frequency step size automatically changes to an appropriate magnitude for a new frequency band.

4. A radio receiver as claimed in claim 2, wherein:

the control system comprises a scan range memory which stores at least two user definable ranges of frequencies through one or more of which the scan control can scan the current selected frequency of the tuner during the second mode of scanning.

5. A radio receiver as claimed in claim 2, wherein:

the frequency memory stores channel identifiers for respective stored specific frequencies and the control system is operative to generate on the display screen in real time the respective channel identifier for the selected one of the stored specific frequencies during the third mode of scanning.

6. A radio receiver as claimed in claim 2, wherein:

upon user selection of the third mode of scanning, the control system is operative to present on the display screen a menu of memory scanning options including a user selectable option of scanning through a user defined portion only of the memory contents.

7. A radio receiver as claimed in claim 1, wherein:

the tuner frequency select control is responsive to input of the frequency change command by the user to change the frequency at one of two or more rates of change which is selectable by the user by a respective input via the input peripheral device, the control system further including a stepping size memory for storing a magnitude of a frequency step size by which the tuner frequency is to be changed when the frequency change command is input.

8. A radio receiver as claimed in claim 7, wherein:

the input peripheral device includes a keyboard having auxiliary keys, the user selection of the different rates of change of the frequency being effected by depressing one of the auxiliary keys of the keyboard simultaneously with inputting the frequency change command, the auxiliary keys being chosen from the "Ctrl", "Shift", and "Alt" keys of a computer keyboard, and wherein the inputting of the frequency change command without depression of one of the auxiliary keys causes the frequency selected to change at a base rate of change, inputting of the frequency change command simultaneously with depression of a first one of the auxiliary keys causes the frequency selected to change at a multiple of the base rate, and inputting of the frequency change command simultaneously with depression of a second one of the auxiliary keys causes the frequency selected to change at a different multiple of the base rate.

9. A radio receiver comprising:

an RF tuner which is operative to receive an input RF signal from an antenna, the tuner including a frequency selector for determining a current selected frequency so that the tuner produces an output signal derived from the selected RF frequency and which can be supplied to a peripheral output device;

a control system coupled to the tuner so as to control the operation thereof including operation of the frequency selector;

a display screen coupled to the control system, the control system being operative to control the presentation of data and the presentation of user selectable inputs by the display screen;

an input peripheral device coupled to the control system and by means of which the user can input data or information or commands to the control system;

the control system including:

a tuner frequency display control operative to cause display on the display screen in real time of the current frequency being passed by the tuner; and a tuner frequency select control responsive to input of a frequency change command by the user via the input peripheral device to cause the frequency selector of the tuner to change the current selected frequency of the tuner in accordance with the frequency change command, the tuner frequency select control being operative to cause display on the display screen of an image of a user selectable tuner frequency modifier, the control system being operative, firstly, in response to user selection of the tuner frequency modifier image via the input peripheral device, to cause the frequency selector of the tuner to change the current selected frequency of the tuner in accordance with the user selection, the tuner frequency modifier image comprising an image of an analogue tuning dial having markings to indicate a simulated rotational position of the dial and, secondly, when the user selects the dial and inputs the frequency change command via the input peripheral device to cause the frequency selector of the tuner to change the current selected frequency, the tuner frequency select control causes display on the display screen in real time of an animation of rotation of the dial for as long as the frequency change command is being input;

the control system further including a stepping size memory for storing a desired incremental frequency step size by which the tuner frequency is to be changed when the user inputs the frequency change command to step up or to step down from an instantaneous tuner frequency.

10. A radio receiver as claimed in claim 9, wherein:

the image of the tuning dial is an image of a circular dial having a marking which occupies different angular positions relative to the centre of the circular dial in response to user selection of the dial and input of the frequency change command so as to thereby simulate rotation of the dial, the image of the dial simulating rotation in a clockwise direction for a frequency change command to increase the current selected frequency and vice versa, and wherein the user selects the dial by entering commands on the input peripheral device so as to move a cursor on the display screen to position the cursor on the image of the dial and the user then inputs the frequency change command while the cursor is positioned on the image of the dial.

11. A radio receiver as claimed in claim 10, wherein:

the input peripheral device comprises a computer mouse having a left mouse button and a right mouse button, user depression of the left mouse button while the cursor is located in the upper half of the image of the dial initiates a decrement of the frequency and simulated rotation of the dial in a counter clockwise direction, depression of the right mouse button while the cursor is in the upper half of the image of the dial initiates an increment of the frequency and simulated rotation of the dial in a clockwise direction, depression of the left mouse button while the cursor is located in the bottom half of the image of the dial initiates an increment of the frequency and simulated rotation of the dial in a clockwise direction, and depression of the right mouse button while the cursor is located in the bottom half of the image of the dial initiates a decrement of the frequency and simulated rotation of the dial in a counter clockwise direction.

12. A radio receiver as claimed in claim 11, wherein:

the control system is operative to generate a cursor on the display screen having the shape of an arcuate double headed arrow only when the cursor is positioned in the image of the dial, the arcuate double headed arrow being concave downwardly when the cursor is positioned in the upper half of the image of the dial and being concave upwardly when the cursor is positioned in the lower half of the image of the dial.

13. A computerized radio receiver comprising:

an RF tuner which is operative to receive an input RF signal from an antenna, the tuner including a frequency selector for determining a current selected frequency so that the tuner produces an output signal derived from the selected RF frequency and which can be supplied to a peripheral output device;

a control system coupled to the tuner so as to control an operation thereof including operation of the frequency selector;

a display screen coupled to the control system, the control system being operative to control the presentation of data and the presentation of user selectable inputs by the display screen;

an input peripheral device coupled to the control system and by means of which the user can input data or information or commands to the control system;

the control system comprising:

a tuner frequency display control operative to cause display on the display screen in real time of the current frequency being passed by the tuner;

a tuner frequency select control responsive to input of a frequency change command by the user via the input peripheral device to cause the frequency selector of the tuner to change the current selected frequency of the tuner in accordance with the frequency change command, a frequency range display control operative to cause display on the display screen of a frequency range display with associated presence indications at points along the frequency range display, the presence indications indicating the presence at particular frequencies of signals of significant strength indicative of detectable RF signals;

a frequency pointer control operative to cause display on the display screen of a frequency pointer which is movable on the display screen in response to movement input commands by the user via the input peripheral device, the tuner frequency select control of the control system being operative in response to input of the frequency change command by the user to cause the frequency selector to change the current selected frequency dependent upon the position of the frequency pointer in relation to the frequency range display;

wherein the control system updates the frequency range display in real time as the current selected frequency is scanned up or down, whereby the frequency range display provides to the user current information concerning the strength of signals at frequencies near to the current selected frequency; and, a background RF tuner additional to the RF tuner having the frequency selector for determining the current selected frequency, the background tuner being operative to receive and detect RF signals in a band of frequencies around the current selected frequency, the background tuner having an associated signal strength detector to provide indications of the strength of the RF signals being received and detected at frequencies within the band, the background tuner being operative to scan through a range of frequencies on either side of the current selected frequency and the signal strength detector being operative to provide a simultaneous indication of the strength of the signals, the frequency range display control of the control system being responsive to the background tuner and to the signal strength detector to regularly update the frequency range display.

14. A computerized radio receiver as claimed in claim 13, further comprising:

a signal strength detector to provide an indication of the strength of the RF signal at frequencies within a band of frequencies around the current selected frequency, and wherein the frequency range display comprises a display of a spectrum of received input signal strength throughout the band of frequencies, the indication comprising peaks in the displayed spectrum, the input peripheral device including a pointer moving means operable by the user to position the frequency pointer on the display screen on any selected peak in the displayed spectrum, the control system being operative in responsive to entry of the frequency change command by the user when the frequency pointer has been positioned on the selected peak to cause the frequency selector to change the current selected frequency to the particular frequency represented by the selected peak in the displayed spectrum.

15. A computerized radio receiver as claimed in claim 13, wherein:

the input peripheral device has a continuous input switch which the user can operate to input a continuous frequency change command, the tuner frequency select control of the control system including a real time frequency changer operative in response to operation of the continuous input switch of the input peripheral device and while the frequency pointer is located on the display screen in a predetermined positional relationship to the frequency range display to cause the frequency selector to continuously scan the current selected frequency up or down from an initial selected frequency for as long as the continuous input switch is operated by the user.

16. A computerized radio receiver as claimed in claim 15, wherein:

the tuner frequency display control is operative to continuously show in real time the instantaneously selected frequency by means of a visible frequency marker superimposed on the frequency range display.

17. A computerized radio receiver as claimed in claim 13, wherein:

the control system provides a user selectable log facility which when selected by the user automatically stores in a memory log the current selected frequency and the current date and time, and provides the user with a prompt for optional user entry of user comments concerning the radio signal received, the memory log being retrievable by the user at a later time.

18. A computerized radio receiver as claimed in claim 13, further comprising:

a background antenna for receiving background RF signals from local RF sources, the background antenna being connected to the tuner, the background antenna being located so as to receive and input to the tuner background RF signals generated by electronic equipment which forms part of the radio receiver, the tuner being operative to compensate the input RF signal by subtracting the background RF signals so as to enable better sensitivity of the receiver to a wanted signal at the selected RF frequency.

19. A computerized radio receiver as claimed in claim 13, wherein:

the control system further includes an Internet mode control selectable by the user by selection of an Internet select switch image, and an Internet site memory containing data including Internet site addresses for a plurality of Internet sites which provide audio and/or audio-visual broadcasting via the Internet, access to the Internet site memory being provided by the Internet mode control to the user upon selection of the Internet select switch, whereby the user can select an Internet site to receive its audio and/or audio-visual broadcast through the peripheral output device of the radio receiver and on the display screen.

20. A computerized radio receiver as claimed in claim 13, wherein:

the frequency range display control is operative to cause display on the display screen of presence indications of different color depending on detected characteristics of the signals at particular frequencies, the characteristics including a nature of the radio signal and whether it is an RF signal containing voice (including music) signals, data signals, and carrier-only signals.

21. A computerized radio receiver as claimed in claim 13, further comprising:

a frequency scan range control operative in response to user commands input by the user through the input peripheral device to select and initiate scanning by the tuner through a frequency range within a wider spectrum of frequencies displayed on the display screen as the frequency range display, the input peripheral device including a computer mouse and the frequency scan range control being responsive to operation by the user of the mouse to click on a start point on the frequency range display and then drag the mouse to an end frequency when, upon release of the mouse button, the range of frequencies covered by the dragging of the mouse becomes delimited as the selected frequency band through which scanning is to occur.

22. A computerized radio receiver as claimed in claim 13, further comprising:

a historical scan memory operative to store scanned frequency spectra including frequencies and signal strength data, the frequency range display control being operative to display past scans through frequency bands in the form of a three-dimensional graph with a horizontal X-axis representing frequency, a vertical Y-axis representing detected RF channels or signal strength, and a receding Z-axis representing time with preceding scans being displaced on the receding Z-axis, the frequency pointer being operable by pointing at different scan spectra to enable selection by the user of an earlier scan to be brought forward as the current real time frequency band.

23. A radio receiver comprising:

an RF tuner for receiving an input RF signal from an antenna, the tuner comprising a frequency selector for determining a current selected frequency so that the tuner produces an output signal derived from the selected RF frequency which can be supplied to a peripheral output device;

a control system for controlling the RF tuner and operation of the frequency selector;

a display screen coupled to the control system, the control system being operative to control the presentation of data and the presentation of user selectable inputs by the display screen;

an input peripheral device coupled to the control system for enabling the user to input data or information or commands to the control system;

the control system comprising:

a tuner frequency display control operative to cause display on the display screen in real time of the current frequency being passed by the tuner, and a tuner frequency select control responsive to input of a frequency change command by the user via the input peripheral device to cause the frequency selector of the tuner to change the current selected frequency of the tuner in accordance with the frequency change command;

a receiver operating mode control operative to cause display on the display screen in real time of a current mode of operation of the tuner, the mode of operation including at least the current frequency band of the tuner operation; and a receiver power control operative to cause display on the display screen of an image of a power switch having an off condition and an on condition and between which the user can toggle by inputting a power command via the input peripheral device, the receiver power control being operative when the off condition of the power switch is selected firstly to cause display on the display screen of a quiescent image of a radio control panel with data presented on the display screen including the display of the current selected frequency being blanked and secondly to cause the tuner to be disabled, the receiver power control being operative when the on condition of the power switch is selected firstly to cause display on the display screen of an active image of the radio control panel with data being presented on the display screen including the current selected frequency and secondly to cause the tuner to be enabled.

24. A computerized radio receiver comprising:

an RF tuner for receiving an input RF signal from an antenna, the tuner including a frequency selector for determining a current selected frequency so that the tuner produces an output signal derived from the selected RF frequency and which can be supplied to a peripheral output device;

a control system coupled to the tuner to control an operation thereof including operation of the frequency selector, a display screen coupled to the control system, the control system operative to control the presentation of data and the presentation of user selectable inputs by the display screen;

an input peripheral device coupled to the control system and by means of which a user can input data or information or commands to the control system;

the control system comprising:

a tuner frequency display control operative to cause display on the display screen in real time of the current frequency being passed by the tuner;

a tuner frequency select control responsive to input of a frequency change command by the user via the input peripheral device to cause the frequency selector of the tuner to change the current selected frequency of the tuner in accordance with the frequency change command, a frequency range display control operative to cause display on the display screen of a frequency range display with associated presence indications at points along the frequency range display, the presence indications indicating the presence at particular frequencies of signals of significant strength indicative of detectable RF signals;

a frequency pointer control operative to cause display on the display screen of a frequency pointer which is movable on the display screen in response to movement input commands by the user via the input peripheral device, the tuner frequency select control of the control system being operative in response to input of the frequency change command by the user to cause the frequency selector to change the current selected frequency dependent upon a position of the frequency pointer in relation to the frequency range display; and, a signal search initiator which is selectable by the user, the frequency range display control being operative in response to selection by the user of the signal search initiator to cause display on the display screen of a real time plot of the strength of detected RF signals throughout a range of frequencies as the tuner scans through the range of frequencies in response to selection by the user of the signal search initiator; and, wherein the control system is operative to initiate a predetermined action upon the signal strength exceeding a predetermined threshold, the predetermined action being selected from a group of actions comprising stopping the scanning of the tuner through different frequencies, pausing the scanning of the tuner through different frequencies, recording of the frequency at which the signal strength has exceeded the predetermined threshold, and initiating recording of the received signal at the predetermined frequency.

25. A computerized radio receiver comprising:

an RF tuner for receiving an input RF signal from an antenna, the tuner including a frequency selector for determining a current selected frequency so that the tuner produces an output signal derived from the selected RF frequency and which can be supplied to a peripheral output device;

a control system coupled to the tuner to control an operation thereof including operation of the frequency selector;

a display screen coupled to the control system, the control system operative to control the presentation of data and the presentation of user selectable inputs by the display screen;

an input peripheral device coupled to the control system and by means of which a user can input data or information or commands to the control system;

the control system comprising:

a tuner frequency display control operative to cause display on the display screen in real time of the current frequency being passed by the tuner;

a tuner frequency select control responsive to input of a frequency change command by the user via the input peripheral device to cause the frequency selector of the tuner to change the current selected frequency of the tuner in accordance with the frequency change command, a frequency range display control operative to cause display on the display screen of a frequency range display with associated presence indications at points along the frequency range display, the presence indications indicating the presence at particular frequencies of signals of significant strength indicative of detectable RF signals;

a frequency pointer control operative to cause display on the display screen of a frequency pointer which is movable on the display screen in response to movement input commands by the user via the input peripheral device, the tuner frequency select control of the control system being operative in response to input of the frequency change command by the user to cause the frequency selector to change the current selected frequency dependent upon a position of the frequency pointer in relation to the frequency range display; and, a sensitivity threshold control operative to provide a threshold for the signal strength enabling identification and response only to signals having a strength exceeding the threshold, the frequency display control being operative to cause display on the display screen of a sensitivity threshold level associated with the frequency range display whereby signals having a strength exceeding the threshold can be seen on the frequency range display; and, the threshold level display comprising a squelch line superimposed on the frequency range display, the separation of the squelch line from a. frequency axis of the frequency range display being indicative of the threshold level, the radio receiver further including a squelch line segmenting control operable in response to user commands to break the squelch line into multiple segments, a distance of each individual segment from the frequency axis being selectively variable under the control of the user whereby the signal threshold level can be selectively varied for different parts of a received frequency spectrum.

* * * * *